United States Patent
Ishihata et al.

(10) Patent No.: US 8,105,142 B2
(45) Date of Patent: Jan. 31, 2012

(54) GAME DEVICE, COMMUNICATION GAME SYSTEM, AND RECORDED MEDIUM

(75) Inventors: Yoshifumi Ishihata, Tokyo (JP); Nobukazu Naruke, Tokyo (JP)

(73) Assignee: Sega Corporation, Tokyo (JP)

( * ) Notice: Subject to any disclaimer, the term of this patent is extended or adjusted under 35 U.S.C. 154(b) by 1378 days.

(21) Appl. No.: 11/481,038

(22) Filed: Jul. 6, 2006

(65) Prior Publication Data

US 2006/0258450 A1 Nov. 16, 2006

Related U.S. Application Data

(62) Division of application No. 10/478,955, filed on Nov. 28, 2003, now Pat. No. 7,336,276.

(30) Foreign Application Priority Data

Dec. 14, 2000 (JP) ................................. 2000-380984

(51) Int. Cl.
*A63F 13/00* (2006.01)
*G06F 19/00* (2006.01)

(52) U.S. Cl. ................... 463/1; 463/23; 463/47; 700/91

(58) Field of Classification Search ................ 463/1, 23, 463/24, 31–34, 40–43, 47, 48; 700/90–93, 700/108; 273/108.1, 237, 148 R
See application file for complete search history.

(56) References Cited

U.S. PATENT DOCUMENTS 5,428,528 A 6/1995 Takenouchi et al.
(Continued)

FOREIGN PATENT DOCUMENTS

JP 06-507736 9/1994
(Continued)

OTHER PUBLICATIONS

Notice of Reasons for Refusal issued by the Japanese Patent Office, dated Dec. 26, 2005, for Japanese Patent Application No. 2005-010170.

(Continued)

*Primary Examiner* — David L Lewis
*Assistant Examiner* — Robert Mosser
(74) *Attorney, Agent, or Firm* — Finnegan, Henderson, Farabow, Garrett & Dunner, L.L.P.

(57) ABSTRACT

The following types of processing are provided in the present invention. 1) Projection processing in which a shadow projected onto the ground of a flying object flying through a virtual space is prevented from becoming too small. 2) Viewpoint moving processing in which a viewpoint is moved automatically so that a character to be displayed is accommodated within the field of vision of the viewpoint at all times. 3) Semi-transparentizing processing in which, when display objects overlap, the display object with the smaller surface area according to [a comparison of] the displayed surface area is made semi-transparent. 4) Relative strength judgment processing in which the relative strength of teams in a team competition is determined on the basis of the sum of the fighting abilities. 5) Leader setting processing in which a leader character is determined and the outcome of the game is judged according to whether or not the leader character is active. 6) Fighting strength balance adjusting processing for adjusting the balance of fighting strength between the teams. 7) Delay preventing processing for causing a communication data receiving side to return a processing result, whereby processing on a transmission side is advanced in response thereto. By means of this processing series, problems specified in conventional communication game systems regarding game screen display, judgments of the relative strength of teams, and game data communication delays can be amended, enabling an improvement in the game quality of a team competition.

16 Claims, 18 Drawing Sheets

U.S. PATENT DOCUMENTS

| | | | |
|---|---|---|---|
| 5,498,003 | A | 3/1996 | Gechter |
| 5,616,031 | A | 4/1997 | Logg |
| 5,618,045 | A | 4/1997 | Kagan et al. |
| 5,738,583 | A | 4/1998 | Comas et al. |
| 5,870,098 | A | 2/1999 | Gardiner |
| 5,899,810 | A | 5/1999 | Smith |
| 5,971,855 | A | 10/1999 | Ng |
| 6,165,068 | A | 12/2000 | Sonoda et al. |
| 6,203,431 | B1 | 3/2001 | Miyamoto et al. |
| 6,475,089 | B1 * | 11/2002 | Lee ................................. 463/40 |
| 6,746,331 | B1 | 6/2004 | Saikawa et al. |
| 2002/0022517 | A1 | 2/2002 | Tokuyama et al. |
| 2003/0003995 | A1 | 1/2003 | Goden et al. |

FOREIGN PATENT DOCUMENTS

| | | |
|---|---|---|
| JP | 8-57154 | 3/1996 |
| JP | 09-047576 | 2/1997 |
| JP | 9-134122 | 5/1997 |
| JP | 2000-189664 | 7/2000 |
| WO | WO 99/21117 | 4/1999 |

OTHER PUBLICATIONS

"The King of Fighters '99 Evolution Official Guide," First Edition, Softbank Publishing Corporation (May 15, 2000), pp. 5-7.

"Oh!," X 1999 Spring Issue, Softbank Publishing Corp. (May 14, 1999), pp. 200-204.

"Inside Windows," Softbank Publishing Corp. (Jul. 1, 1998), 4:90-102.

Notice of Reasons for Refusal dated Dec. 1, 2005, issued by the Japanese Patent Office in Japanese Application No. 2002-549346.

Computer Graphics Lecture, First Edition, First Print, pp. 185-189, Nov. 10, 1997 Corona Publishing Co., Ltd., Tokyo, Japan.

Direct X—Introduction to 3D Game Programming, First Edition, First Print, p. 8, Sep. 21, 2000, Impress Corporation.

International Search Report, mailed Apr. 2, 2002.

* cited by examiner

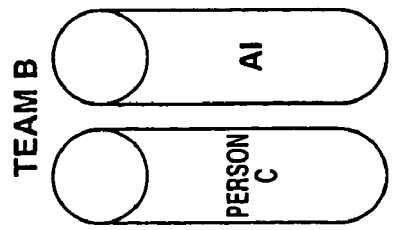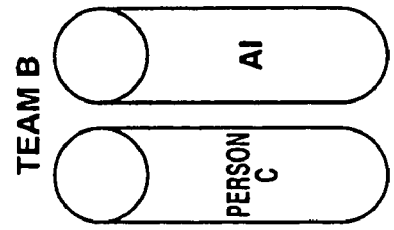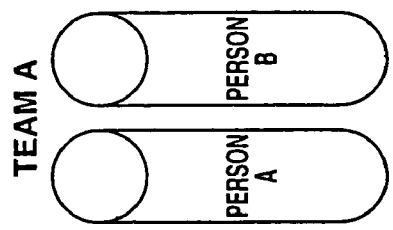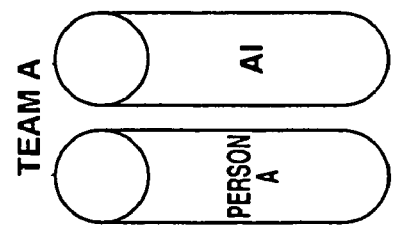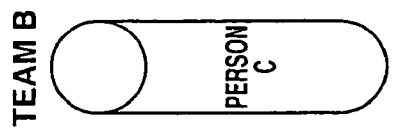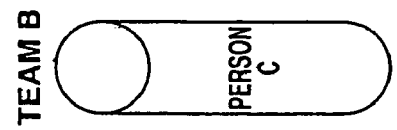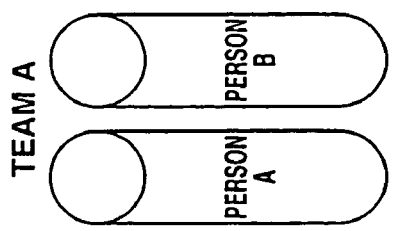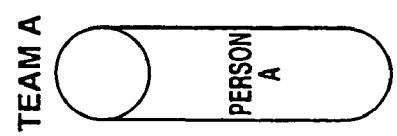
FIG.8A
FIG.8B

GAME DEVICE, COMMUNICATION GAME SYSTEM, AND RECORDED MEDIUM

This is a divisional of application Ser. No. 10/478,955, filed Nov. 28, 2003 now U.S. Pat. No. 7,336,276, which claims priority under 35 U.S.C. §119 to Japanese Patent Application No. 2003-380984, filed Dec. 14, 2000, both of which are incorporated herein by reference.

TECHNICAL FIELD

The present invention relates to a communication game system in which game devices are connected to each other via a network. More particularly, the present invention relates to a communication game system suitable for a competitive communication game in which a plurality of players form a single team, each manipulating his or her own character, and teams compete for victory.

BACKGROUND ART

Communication game systems are known in which game devices operated by individual players are connected via a network such that a competitive game can be executed among players in remote locations.

This type of communication game system is constructed such that when a request to compete is placed to one game device from another game device, the requested game device manages a transaction to accept a competition with the game device which placed the request. Thus a competitive game can be played between the two game devices while transceiving commands and game data. By means of this type of communication game system, a player can enjoy a game competition with another player in a remote location.

In communication game systems up to the present, however, when a competitive game in which a plurality of players form a team and compete against an opposing team in a multiple player against multiple player format (to be referred to below as a "team competition" or a "multiple player against multiple player competition"), many points relating to game image display, judgment of the creative strength of the teams, and game data communication require improvement.

Firstly, in relation to game image display, the following points for improvement have been specified. In a shooting game (a game in which bullets or light beams are fired to topple an opponent), the "light beam bullets" emitted from the object manipulated by the player, or in other words the character, toward an opponent character are accompanied on the ground surface by a projected image object (for example an artificial shadow) to provide a sense of realism.

In this specification, according to a world coordinate system which can be used to conveniently define a virtual space, the character is assumed to "stand" on an XZ plane, and a virtual "ground surface" is defined as running irregularly along the XZ plane. Hence the forward direction in the Y axis direction is defined as the "up" direction, and the Y axis coordinate is defined as "height".

More specifically, a virtual point light source is set directly below the light beam bullet, and the light from the point light source is projected onto the ground surface as a shadow, thereby emulating the shadow of the light beam bullet. In this case, the magnitude of the shadow projected onto the ground surface is processed to become smaller in relation to the height of the light beam bullet.

However, when the light beam bullet is far above the ground surface, the shadow of the light beam bullet becomes extremely small, causing a problem in that the player is substantially unable to recognize the shadow on the displayed screen.

Further, the viewpoint in the virtual space which defines the game image displayed on each display device is fixed diagonally rearward from above the head of the object manipulated by the player, or in other words the character. Hence the viewpoint position is constantly fixed until the player manually alters the viewpoint position. This causes a problem in that when there are a large number of displayed images, some of the images move out of the field of vision and are not displayed. Conversely, when the viewpoint is set in advance far away from the displayed objects in order to avoid this problem, the individual objects are displayed in small size on the display screen, leading to a reduction in the sense of realism. Displaying a split screen on which the positions of the display images that have moved out of the field of view are displayed has been considered, but the calculation processing load required to display a split screen is high, and since the player must pay attention to two or more screens, s/he may become confused and lose the ability to concentrate on the game. A method of moving the viewpoint in accordance with the movements of the character manipulated by the player has also been considered, but in this method the field of vision for displaying images only responds to the movements of this character, and thus the display objects that the player wishes to see may not be displayed, meaning that the player must search for the objects to be seen separately.

A problem has also been specified regarding the display of objects displayed as a part of the background. For example, in order to make a structure in a sea set inside a virtual space (a building post, the bottom surface of a ship, or the like) appear to be actually submerged, a texture for illustrating seawater is synthesized with the texture of the structure. In this case, color calculation processing for synthesizing the textures is performed by means of calculations such as addition and multiplication of the color components of the pixels constituting both textures. In this type of method, however, the calculation processing amount for making the entirety of an object which occupies a large area of a screen, such as the sea surface, semi-transparent is large, which sometimes causes a deterioration in the overall processing performance of the game device.

Secondly, regarding judgments of the relative strength of the teams, the following problems have been specified. First, in game devices up to the present, information indicating the remaining fighting strength (for example physical strength) in the game of a player's own character has been displayed using meter information or the like displayed on the game screen, but no function exists for judging or displaying the relative strength of each team for the team as a whole. On the game screen of each player, the physical strength of the player's own character, another character, or all of the characters is displayed individually, but display of the remaining fighting strength of the team as a whole is not provided. Hence there is a need for each player to be able to ascertain this information by means of a fixed operation.

When playing a team competition, games have been designed to conclude when the number of remaining characters on one of the teams reaches zero. According to this method, however, the player must always keep track of the state of the remaining characters, which is troublesome. Moreover, calculation processing is required for displaying the number of remaining characters on one team on the game device of the other team at all times, causing a reduction in the overall processing performance.

Further, when playing a team competition, the team having the most members is of course advantaged, but in game systems up to the present, participation in the game is closed even when there is a disparity in the number of players constituting a team, and thus games are often begun under unequal conditions. If the game is continued under such unbalanced conditions, one team alone becomes superior, and since competition cannot be conducted under equal conditions, the desire of the players to play the game wanes and the sense of tension decreases.

When one of the characters forming a team falls during a competition, that team has one less member than the opposing team, leading to a disparity in the team numbers. Conventionally the game continues even in this situation, and hence the player who was manipulating the fallen character can only wait for the game to end without being able to do anything. Moreover, the other players belonging to the team of the fallen character must continue the game with a diminished number of characters.

Thirdly, problems have been specified in relation to delays in processing the data required for game processing. More specifically, up to the present, when an occurrence (to be referred to as an "event" hereinafter) occurs on one of the game devices such as a light beam bullet being fired, the game device on which the event occurred performs game processing in accordance with the event, and when the processing is complete (when an opponent is toppled by the light beam bullet, for example), the result of the processing is transmitted to the opposing game devices via a network. When data are transceived through a network, however, time delays are inevitable, and hence the reception side game device receives the data at a time delay. Since the game progresses synchronously on the transmission side and reception side game devices, such data delays may cause images to be displayed "out-of-sync". When an event occurs in which a light beam bullet is fired, for example, the processing up to the point at which the light beam bullet strikes the opponent is performed on the transmission side game device, and then data indicating that the opponent has been shot are transmitted as the processing result. If the opponent to be processed as being shot moves during transmission of the processing result, the light beam bullet is displayed as a direct hit on the opponent even though the light beam bullet does not strike the opponent directly once the opponent has moved. Hence an image indicating that the opponent has been processed as being shot by a light beam bullet that could not have been a direct hit is mistakenly displayed. Since this is not due to a lack of gaming skill on the part of the player manipulating the opponent, the player feels unfairly disadvantaged by an internal fault in the game device or game program (a communication delay, strike judgment setting defect, or similar), and may lose further interest in the game.

Considering these numerous problems, a first object of the present invention is to provide a game device for eliminating problems relating to game image display that have been specified on conventional game devices.

A second object of the present invention is to provide a communication game system for eliminating problems relating to judgments of the relative strength of teams that have been specified on conventional communication game systems.

A third object of the present invention is to provide a communication game system for eliminating problems caused by game data communication delays that have been specified on conventional communication game systems.

In order to achieve the first object, the present invention is a game device constituted to be capable of displaying a spatial object positioned at a remove from a terrain surface set within a virtual space, comprising a projected image generating module for generating a projected image object emulating a projected image of the spatial object on the terrain surface, and a projected image modifying module for moving the projected image object in accordance with the movement of the spatial object, modifying the magnitude of the displayed projected image object in accordance with the position of the spatial object within the virtual space and the position of a virtual light source set within the virtual space, and holding the magnitude of the projected image object at a predetermined magnitude when the distance of the spatial object from the terrain surface exceeds a reference distance.

In the present invention "module" indicates a unit comprising a predetermined function which is executed by a software program and hardware in conjunction.

Here, "virtual space" indicates a space defined by a logically set coordinate system for performing CG processing.

Here, "spatial object" generally refers to an object which floats within the virtual space, and in the case of a shooting game may refer to a fired light beam bullet. The spatial object may also be a character manipulated by a player. The spatial object may also be a flying body which accompanies the aforementioned virtual light source.

Here, for example, the aforementioned game is a shooting game, and the spatial object is a light beam bullet fired from a weapon of a character who appears in the shooting game.

Here, "character" is an object within the virtual space which can be modified by an operation of a player operating a game device or by the game device itself, and is the main participant in the competitive game. A character includes a home character which can be manipulated by a player, and enemy characters which are manipulated by game devices operated by other competing players.

The present invention is also a game device constituted to enable players to play a game by manipulating a home character within a virtual space, comprising an image generating module for generating a game image projected onto a two-dimensional plane which incorporates into a field of vision the front of the home character from a viewpoint behind the home character, and a viewpoint position controlling module for moving the viewpoint position within the space behind the home character in accordance with the position or movement within the virtual space of characters to be incorporated into the field of vision.

Here, "behind" and "front" refer to directions relating to the home character within the virtual space, which have been determined for the sake of convenience. In the case of a character emulating a human being or robot, these directions correspond to what is generally known as a front-rear relationship.

Here, when the viewpoint position controlling module, for example, moves the viewpoint position within the space behind the home character, the viewpoint position is moved within a range at which the distance between the viewpoint and home character remains within a predetermined distance.

Further, when a character to be incorporated into the field of vision moves out of the field of vision, the viewpoint position controlling module moves the viewpoint at a predetermined speed to incorporate into the field of vision the character to be incorporated into the field of vision.

The present invention is a game device constituted to enable players to play a game by manipulating a home character within a virtual space, comprising an image generating module for generating a game image projected onto a two-dimensional plane which incorporates into a field of vision the front of the home character from a viewpoint behind the home character, and a viewpoint position controlling module for moving the viewpoint position within the space behind the home character in accordance with the position or movement within the virtual space of characters to be incorporated into the field of vision, wherein the game is a game in which a plurality of characters move within a virtual space, and the viewpoint position controlling module controls the viewpoint position in accordance with the position or movement of the home character and the other characters.

Here, the viewpoint position controlling module may move the viewpoint position within a range at which the distance between the viewpoint and the home character remains within a predetermined distance range, such that the number of other characters displayed on the game image is maximized.

Further, the present invention is a game device constituted to enable players to play a game in a virtual space, comprising a specifying module for specifying a plurality of display objects having at least a partially overlapping relationship within the virtual space, a comparing module for comparing the surface area of each of the plurality of specified display objects when the display objects are displayed as a game image, a semi-transparentizing processing module for making the display object with the smaller surface area according to the comparison semi-transparent, and an image generating module for generating a game image by disposing the semi-transparentized display object to the front when seen from the line of vision of the game image.

Here, the "display object" may be an object forming a part of the background or a character.

In order to achieve the second object, the present invention is a communication game system in which a plurality of game devices are connected to each other to enable a competitive team game to be played in which at least two players operating the game devices form one team, comprising a relative strength judging module for judging the relative strength of the teams playing the competitive game on the basis of the total fighting ability within a team, and an image generating module for generating an image displaying the results of the judgment.

Here, the relative strength judging module determines the relative strength of the teams by calculating the proportion of a maximum fighting ability value of the characters manipulated by the players in the competitive game that is occupied by a current fighting ability value, and totaling this proportion for each team.

Further, the present invention is a communication game system in which a plurality of game devices are connected to each other to enable a competitive team game to be played in which at least two players operating the game devices form one team, comprising an activity judging module for determining the relative strength of the teams playing the competitive game according to whether or not a leader character designated as the leader of each team is active during the competitive game, and a relative strength judging module which, when the leader character is judged to be active, judges the team to which the leader character belongs to be the winner.

Here, "active" refers to a case in which a character survives (or in other words is "alive") without being eliminated, for example.

Further, the competitive game may be constituted such that a stage in which an outcome is determined can be executed a plurality of times during each competitive game, and may comprise a leader switching module for automatically switching the character designated as leader at each stage, and a game executing module for executing each stage of the game under the leader character switched by the leader switching module.

Here, the leader switching module may be constituted to automatically reselect the leader character with the best results throughout the previous stages in each stage.

The leader switching module may also be constituted to automatically reselect the leader character with the best results throughout the previous stages in the final stage.

The activity of the leader character may be determined with reference to the fact that the leader character has remaining physical strength.

A competition time of the game may be determined in advance such that if the leader characters of both teams are active when the competition time has elapsed, the team whose leader character has the most remaining physical strength is judged the winner.

Alternatively, a competition time of the game may be determined in advance such that if the leader characters of both teams are active when the competition time has elapsed, the remaining physical strength of the characters belonging to each team is totaled and the team with the greatest total physical strength is judged the winner.

The present invention is a communication game system in which a plurality of game devices are connected to each other to enable a competitive team game to be played in which at least two players operating the game devices form one team, comprising an activity judging module for determining the relative strength of the teams playing the competitive game according to whether or not a leader character designated as the leader of each team is active during the competitive game, and a physical strength distributing module which, when the physical strength of a character other than the leader character within a team decreases, distributes the physical strength of the leader character to the character with reduced physical strength.

Further, the present invention is a communication game system in which a plurality of game devices are connected to each other to enable a competitive team game to be played in which at least two players operating the game devices form one team, wherein each of the plurality of game devices comprises a condition considering module for considering predetermined conditions corresponding to the balance of fighting strength between the teams playing the competitive game, and a fighting strength balance adjusting module for adjusting the balance of fighting strength between the teams in accordance with the conditions.

Here, the fighting strength balance adjusting module may match the number of characters in each team participating in the competitive game at the start of the competitive game.

The fighting strength balance adjusting module may also place weighting conditions on the team having an advantage of a predetermined standard or higher in accordance with an imbalance arising between the teams during the course of the competitive game.

Here, "weighting conditions" includes prohibiting an attack by a character for a fixed time period or prohibiting modification of the orientation of the character.

The fighting strength balance adjusting module may also place the weighting conditions in accordance with one or more conditions (corresponding to the aforementioned predetermined conditions) selected from a group of conditions indicating an imbalance between the teams, this group comprising the number of characters on each team, the set ability of each character in the game, the competition-winning percentage of each character, and the competition-winning percentage of each team.

The fighting strength balance adjusting module may also be constituted to perform processing according to which one character helps another character within a team during the course of the competitive game.

Here, each game device may comprise a tracking object setting module for setting as a tracking object one character from among the characters comprising an opposing team on the basis of predetermined conditions, and a tracking module for modifying the position or orientation of the home character manipulated by the player until the home character enters a range within which the character set as the tracking object can be attacked.

Here, the tracking module may further comprise a correcting module for correcting the position or orientation of the home character in accordance with the movement of the character set as a tracking object such that the home character enters the range within which the character can be attacked.

In this case, one or more conditions selected from a group comprising the absolute physical strength value of the opponent, the relative physical strength value of the opponent to the home character, attacking strength, defense strength, the presence of a set leader, and the winning percentage of the player manipulating the character may be used as the "predetermined conditions".

In order to achieve the third object, the present invention is a communication game system in which a plurality of game devices are connected to each other to enable a competitive team game to be played by a plurality of players operating the game devices, wherein the game devices respectively comprise an event transmitting module which, when a predetermined event occurs, transmits data indicating that this event has occurred to the other game devices implementing the competitive game, a data receiving module for receiving data from one of the other game devices implementing the competitive game, a processing result transmission module for executing game processing based on the received data and transmitting data indicating the result of this processing to the other game devices implementing the competitive game, and a game image generating module for generating a game image based on the processing result.

Here, when three or more game devices are connected to each other, the game image generating module is constituted such that the data indicating a processing result, which are transmitted from the game devices in response to an event occurring in another game device, are received by all of the other game devices implementing the competitive game, whereupon a game image based on the plurality of received processing results is generated.

The data indicating that an event has occurred in each of the game devices may include at least information specifying the game device which caused the event and information indicating the content of the event.

When the data indicating that an event has occurred are received in each of the game devices, a game image corresponding to the game device which caused the event and the content of the event may be generated, and the data indicating a processing result may include at least information specifying the game device which caused the event, the content of the event, and the result of processing in the game devices corresponding to the event.

Here, the present invention is wherein an attack perpetrated by one character is transmitted as the event from a transmission side game device to a reception side game device, a direct hit judgment is performed by the reception side game device to determine whether or not the attack hit the character specified as the attack subject, whereupon the result of this direct hit judgment is transmitted back to the transmission side game device as a processing result, and when the processing results of the other game devices participating in the competitive game are all gathered in the transmission side game device, game processing based on the processing results is performed in the transmission side game device.

In each of the inventions described above, the game is a shooting game in which characters manipulated by players shoot each other to compete for victory, for example.

The present invention is a machine readable recording medium recorded with a program for causing a computer to execute a game method for implementing each of the inventions described above.

Here, "recording medium" refers to a so-called medium such as a CD-ROM, CD-R, CD-R/W, DVE, MD, DAT, FD, or HD for storing digital data. In cases where program data are received by means of communication through a network, the network through which the program data pass is itself included in the definition of "recording medium".

BRIEF DESCRIPTION OF THE DRAWINGS

FIG. 8 is a view illustrating an example of auxiliary processing;

BEST MODE FOR CARRYING OUT THE INVENTION

An embodiment pertaining to the present invention will be described below on the basis of the drawings.

Figure 1:
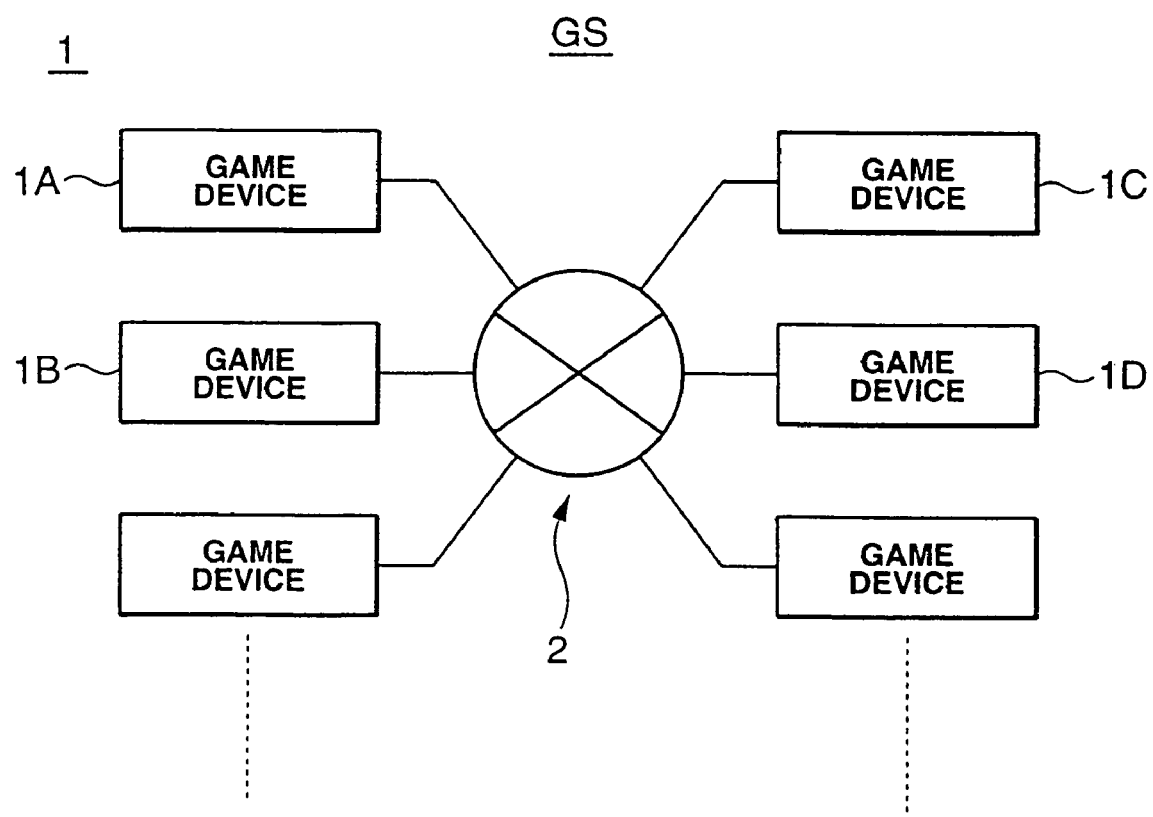
FIG. 1 is a block diagram of a communication game system according to an embodiment of the present invention.

FIG. 1 shows the schematic constitution of a communication game system GS according to this embodiment. In this communication game system GS, a plurality of game devices 1 (1A, 1B, 1C, 1D, . . . ) operated by players are connected to each other via a network 2 serving as communication means. Through this communication game system GS, an unspecified large number of players can conduct a shooting game as a team competition (a multiple player against multiple player competition).

Note that in the following description, the configurations and functions required to conduct a competitive game on a plurality of game devices mainly using a communication function will be described. However, when a competitive game using a communication function is not performed, each game device 1 is constructed to be capable of functioning as a stand-alone game device.

The communication network 2 is a public line or private line forming a WAN (Wide Area Network) such as a private game network or the Internet. When the communication network 2 is the Internet, an unspecified large number of computer devices are capable of communication, and using various commands defined by TCP/IP protocols, files can be viewed, electronic mail and files can be transferred, and so on. Note, however, that the communication network does not have to be a WAN, and may be a local network such as a LAN operated on a closed circuit.

Also note that a game server system may be connected to the communication network 2 such that the game server system is entrusted with the management of a part or all of the game.

Figure 2:
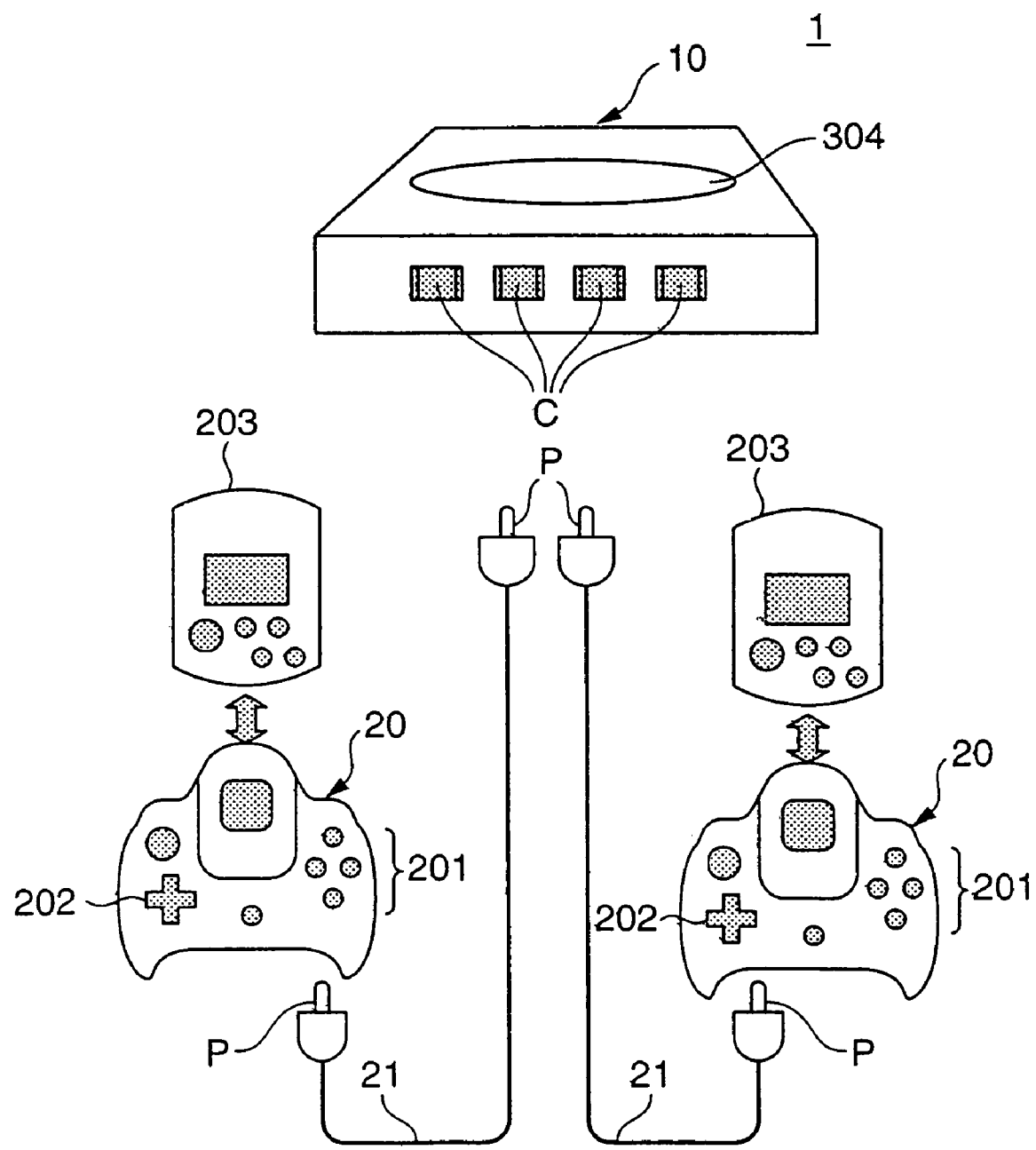
FIG. 2 is a schematic view showing the outer appearance of a game device incorporating this communication game system.
Figure 3:
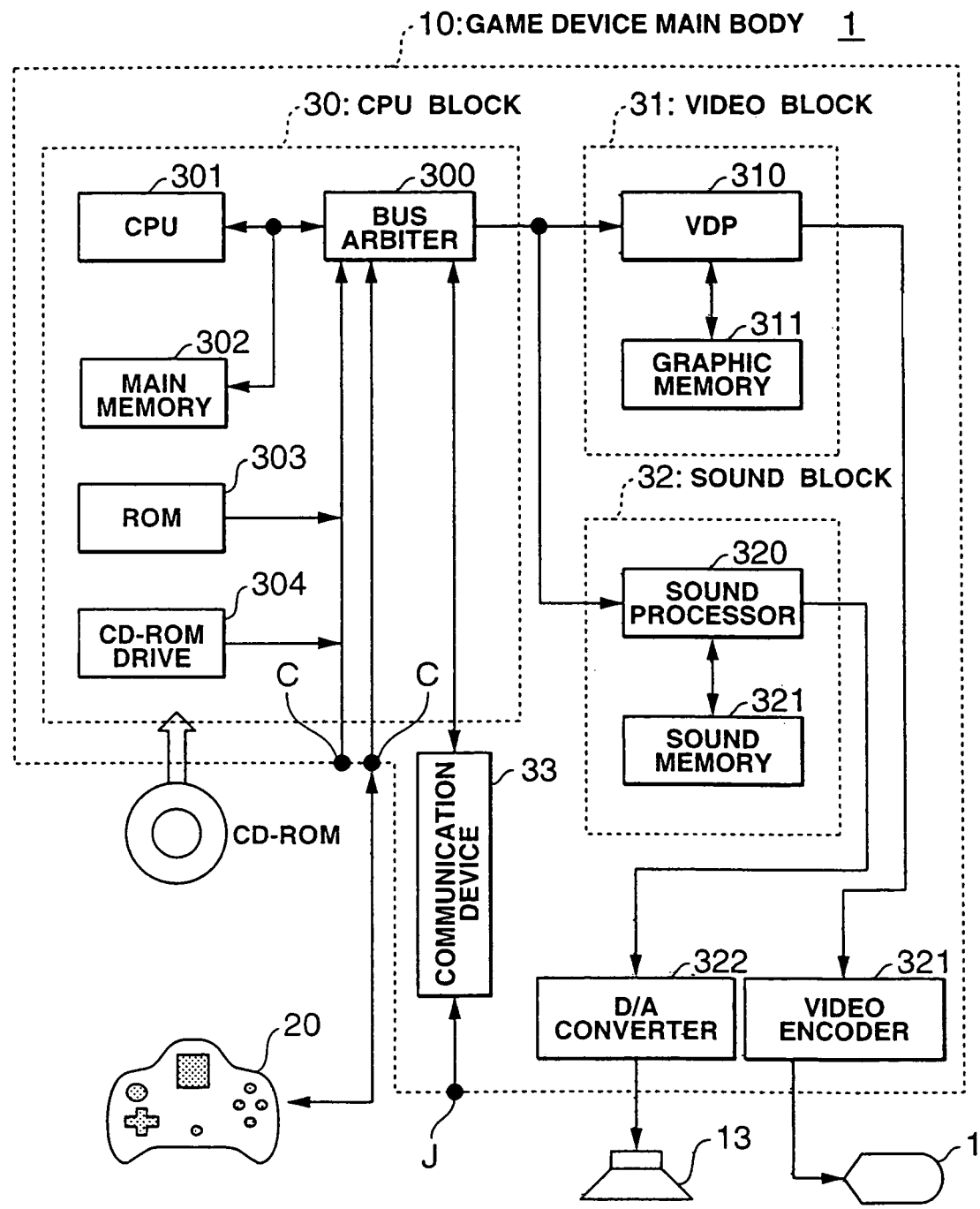
FIG. 3 is a block diagram showing in outline the electrical configuration of the game device.

FIG. 2 is a schematic view of the game device 1, and FIG. 3 is a block diagram of the electrical hardware of the game device 1.

As shown in FIG. 2, the game device 1 is constructed by connecting a game device main body 10, a controller 20, and back-up memory 203 to each other.

The game device main body 10 is a control device body for controlling the progress of a game. The game device main body 10 may be connected to a plurality of the controllers 20 through connectors C. The game device main body 10 comprises a CD-ROM drive 304 (see FIG. 3) into and from which a recording medium such as a CD-ROM can be freely inserted and removed.

The controller 20 is constituted by an operating portion which is operated by a player, the operating portion comprising a group of buttons 201, an arrow key 202, and so on. The controller 20 may be connected to the game device main body 10 through a connection cord 21 provided with a connector P. The back-up memory 203 may be removably connected to the controller 20.

The game device main body 10 is constituted similarly to a computer device, and as shown in FIG. 3, comprises a CPU block 30, a video block 31, a sound block 32, a communication block 33, and so on.

The CPU block 30 comprises a bus arbiter 300, a CPU 301, main memory 302, ROM 303, and the CD-ROM drive 304. The bus arbiter 300 is constructed to be capable of controlling the transmission and reception of data by allocating bus occupying time among the devices connected to each other via a bus. The CPU 301 is constructed to be capable of accessing the main memory 302, ROM 303, CD-ROM drive 304, video block 31 and sound block 32, and of accessing the back-up memory 203 via the controller 20.

The CPU 301 performs various types of game processing and control required to execute a team shooting game by means of communication, and is capable of transferring image data to graphic memory 311 and sound data to sound memory 321.

The processing executed by the CPU 301 includes reception processing for the various types of operation information instructed from the controller 20, processing for reflecting the received information in the game, character behavior calculation (simulation) processing, light source processing, viewpoint movement control processing, semi-transparentizing processing, and so on.

Behavior calculation is for simulating character movement in a virtual space. In order to execute this processing, the coordinates of character polygons in the virtual space are determined, whereupon a conversion matrix and form data (polygon data) for converting these coordinate values into a coordinate system for a two-dimensional field of vision are instructed to a VDP 310. Note that "polygon data" refers to a coordinate data set comprising a relative coordinate and an absolute coordinate of each vertex of a polygon (a multi-angled form, mainly triangles and quadrilaterals) which is constituted by the aggregate of a plurality of vertices.

The ROM 303 is the storage region for an initial program loader. The ROM 303 is an element constituting a part of the recording medium of the present invention, and programs required in the processing of the CPU 301 are recorded thereon in advance. Note that external memory such as a CD-ROM may be used as the recording medium.

The CD-ROM drive 304 is an element constituting a part of the recording medium of the present invention, and also uses a CD-ROM as a recording medium for externally supplied data. The CD-ROM drive 304 may also be constituted to transfer programs to memory through the communication device 33. By means of such setting, data may be transferred from a fixed disk or the like of a remote server.

The video block 31 comprises the VDP (Video Display Processor) 310, the graphic memory 311, and a video encoder 312. By means of this constitution, the video block 31 is capable of generating 3D image data and moving images. More specifically, textures are applied to the form data of the converted field of vision coordinate system, polygon screens such as characters, other objects, and terrains defined in accordance with the XZ plane of the world coordinate system are synthesized on a prescribed priority basis with scroll screens such as alphanumerical information, and final frame image data are generated at fixed time intervals. These data become the game images provided to the players.

The video encoder 312 converts the image data generated by the VDP 310 into predetermined television signals in an NTSC format or the like such that the data can be outputted to a main monitor 12 (such as the cathode-ray tube of a television receiver) that is connected to the outside.

The sound block 32 comprises a sound processor 320, the sound memory 321, and a D/A converter 322. By means of this constitution, the sound block 32 performs sound synthesis based on waveform data and is thereby capable of outputting acoustic signals. The D/A converter 322 converts the sound data generated by the sound processor 320 into analog signals and is thereby capable of outputting the analog signals to a speaker 13 (the speaker of a television receiver or the speaker of an acoustic device) connected to the outside.

The communication device 33 is a modem, terminal adapter, or LAN adapter, for example, and functions as an adapter for connecting the game device main body 10 and the communication network. The communication device 33 receives data transmitted from a game supplying server such as an Internet server connected to a public network, and is thereby capable of supplying the data to the bus of the CPU block 30. If the communication network is a public network, no differentiation is made between a subscriber line and a private line or between wired and wireless constitutions. The communication mode may be a broadband connection such as FTTH, ADSL, or CATV Internet, or a non-broadband connection such as ISDN or an analog line.

Next, referring to FIGS. 4 through 19, the processing performed in the communication game system of this embodiment will be described.

Figure 4:
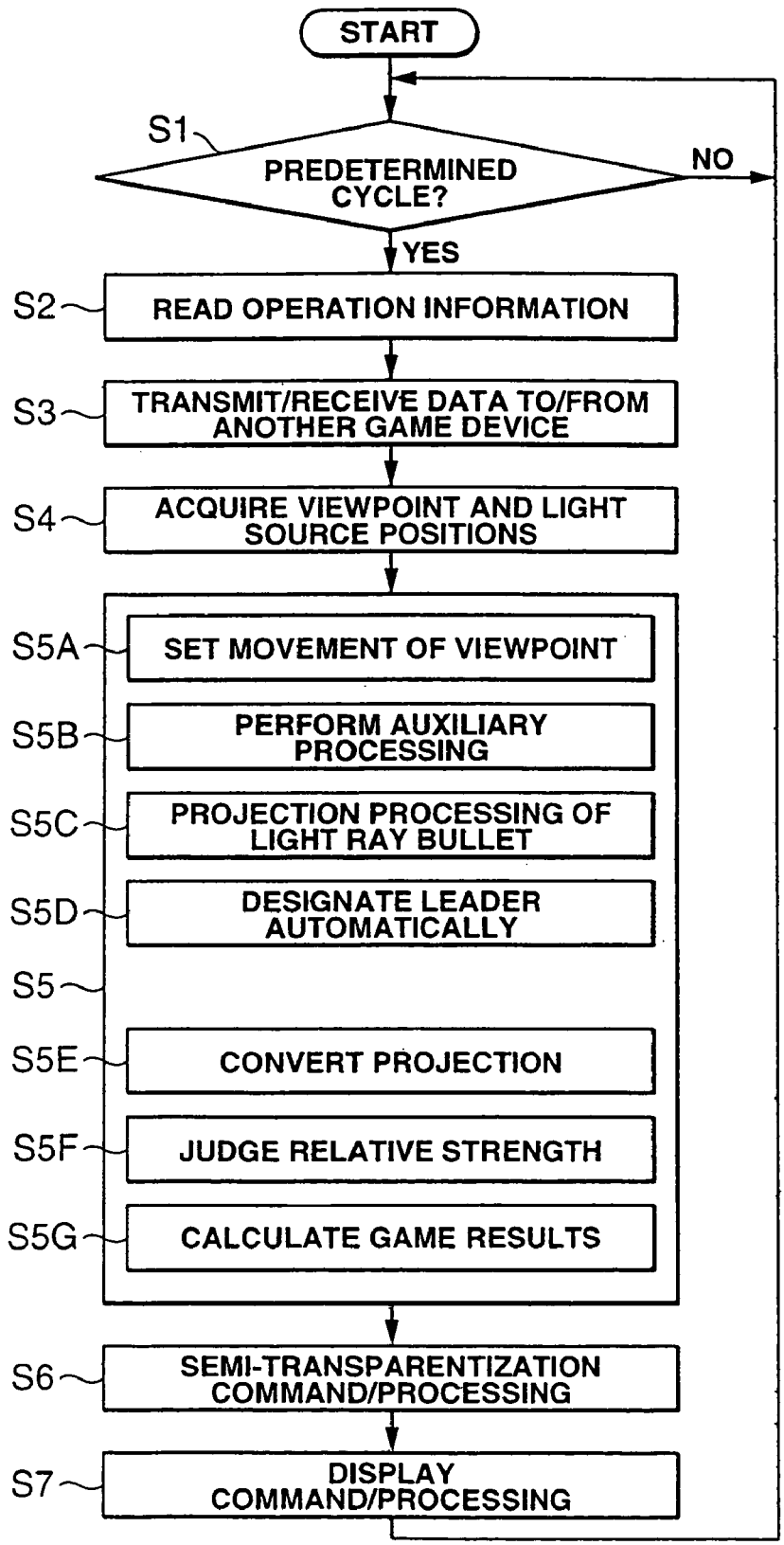
FIG. 4 is a schematic flowchart showing an example of the flow of a competitive game.

The flowchart in FIG. 4 shows an outline of the functions executed by each game device 1 (1A, 1B, 1C, 1D, . . . ) in a fixed cycle. As shown in FIG. 4, when the timing of a game image update cycle (for example a field period of a video signal or a frame period) is reached (step S1), the CPU 301, in succession, reads the operation information from a player inputted through the controller 20 (step S2), transmits and receives data to and from the other game devices via the communication network 2 (step S3), and obtains a viewpoint position (the viewpoint in the virtual space from which game images are generated) through manual setting performed by the player and a light source position from stored information (step S4). Next, the CPU 301 performs game processing including various types of processing relating to the game screen display, the outcome of the team competition (the relative strength of the teams), and so on (step S5), commands semi-transparentizing processing (step S6), and commands display processing (step S7).

Game processing comprises automatic viewpoint setting (step S5A), processing to compensate for imbalances in team strength during the team competition (step S5B), projection processing for the light beam bullet serving as a spatial object (step S5C), automatic setting of a leader for each team (step S5D), projection conversion from a world coordinate system into a field of vision coordinate system (step S5E), judgment of the relative strength of each team (step S5F), calculation of the game results (step S5G), and so on. Note that steps S5A to S5G may be performed in any appropriate order.

Note that none of the processes described above (steps S5A through S5G) end within the game update cycle, but are performed as a sum total obtained throughout many update cycles. Accordingly, the game device checks the conditions corresponding to the content of each process (S5A through S5G) at each update cycle, and if an event has occurred, the processing therefor is performed. If no event has occurred, processing advances to another step.

Further, the steps shown in FIG. 4 do not have to be performed in the illustrated order, but may be executed in a different order if implemented within the update cycle or a fixed cycle.

Processes S5A through S5G will be described in detail below. In the following description, "home character" indicates a character which can be operated by a player, and "enemy character" indicates a character which can be operated by another player.

Further, in this communication game system, a team may be formed between players in remote locations operating different game devices connected to each other via the network, or a team may be formed between players connected to the same game device through respective controllers. For example, players operating the same game device may belong to different teams and compete against each other.

(Viewpoint Movement Setting)

The viewpoint movement setting processing of this embodiment will be described on the basis of FIGS. 5 through 7. This viewpoint movement setting differs from conventional processing, in which a player modifies the viewpoint manually by operating a controller, in that the viewpoint is moved automatically so as to display an appropriate image on the game device. More specifically, when generating a game image to be projected on a two-dimensional plane which incorporates within the field of vision the front of the home character from a viewpoint behind the home character, the game device moves the viewpoint position within the space behind the home character in accordance with the position or movement within the virtual space of characters to be incorporated in the field of vision.

Figure 5A:
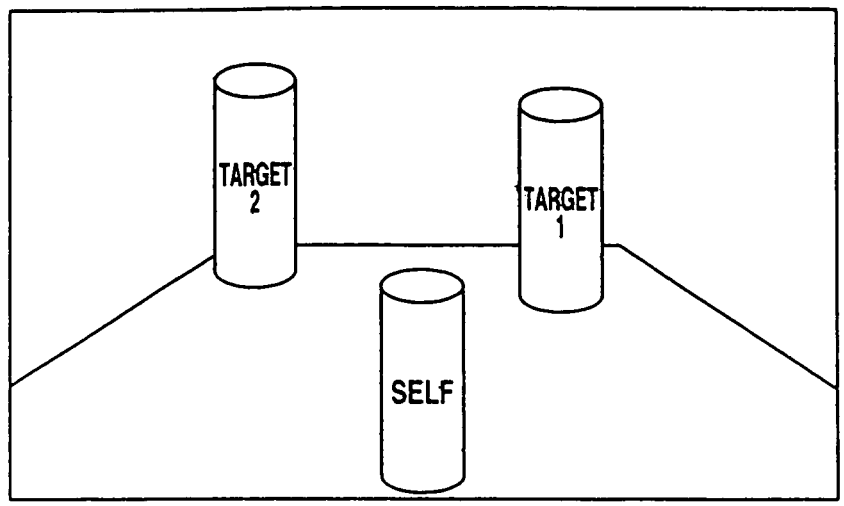
FIG. 5 is a view schematically illustrating automatic viewpoint setting.
Figure 5B:
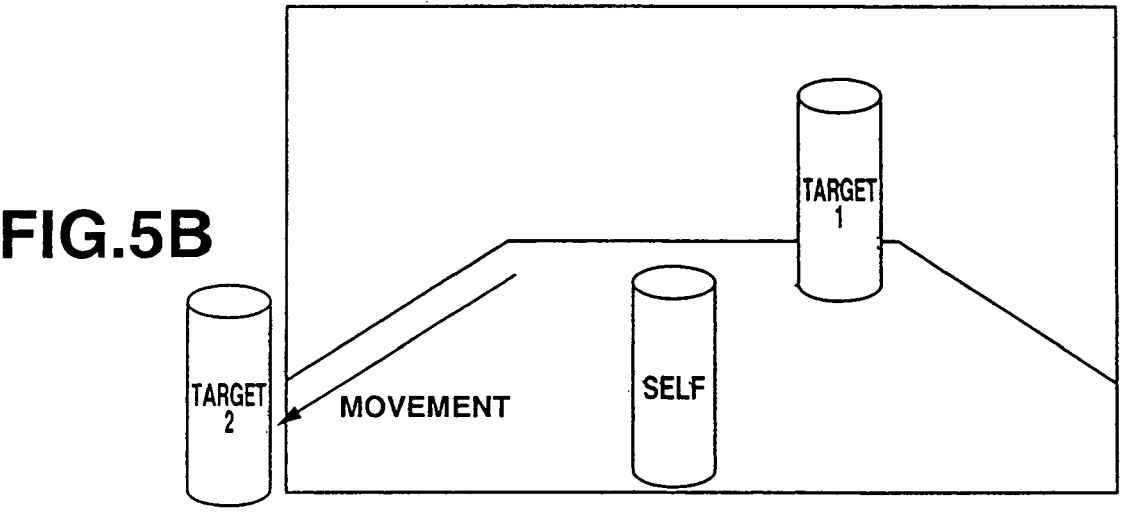

Conventionally, the viewpoint from which the game image is generated has been fixed in a fixed position above and behind the head of the player. According to this method, when a large number of display objects (a plurality of enemy characters, for example) exist within a large number of spaces, it is sometimes impossible for all of the display objects to fit onto the game screen. As shown in FIG. 5A, such a situation arises when the home character and enemy characters (targets) 1, 2 are displayed on the game screen and the enemy character 2 makes a large movement, for example. In other words, when the enemy character 2 moves out of the frame of the game image, it becomes impossible to accommodate the enemy characters 1, 2 within the frame from a fixed viewpoint, as shown in FIG. 5B.

Figure 5C:
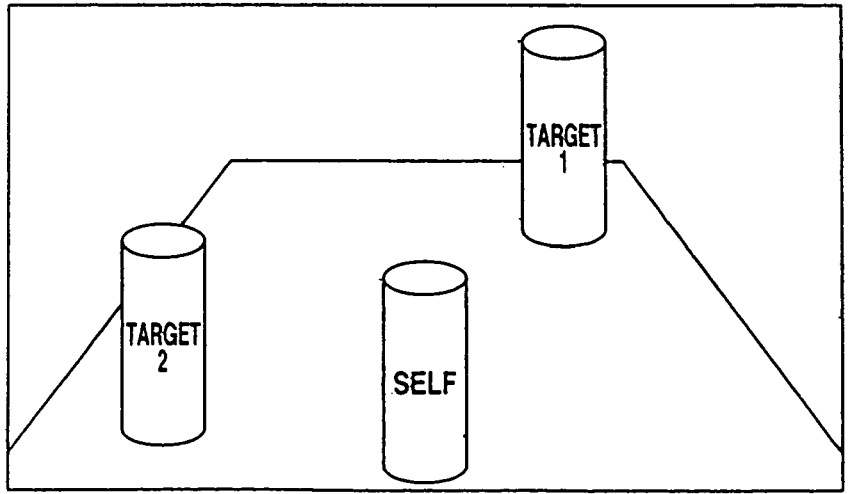

Hence in this embodiment, the viewpoint position is moved within the space behind the home character in accordance with the position or movement within the virtual space of the characters (target enemy characters and the like) to be accommodated within the field of vision. More specifically, the viewpoint is moved at a predetermined speed such that the characters (enemy characters) to be accommodated within the field of vision enter the field of vision. As shown in FIG. 5B, for example, when an enemy character moves, the CPU 301 performs control to move the viewpoint rearward and/or upward in the direction of the line of vision at a predetermined speed, whereby both of the enemy characters 1, 2 are accommodated within the screen. As a result, a game image accommodating all display objects is displayed as shown in FIG. 5C.

At this time, the viewpoint is moved within a range at which the distance between the viewpoint and the home character is not more than a predetermined distance. This distance is set to a distance which is not so far removed from the characters that the characters become too small within the game image. If the viewpoint is too far from the characters, the sense of realism of the game image deteriorates.

Figure 6:
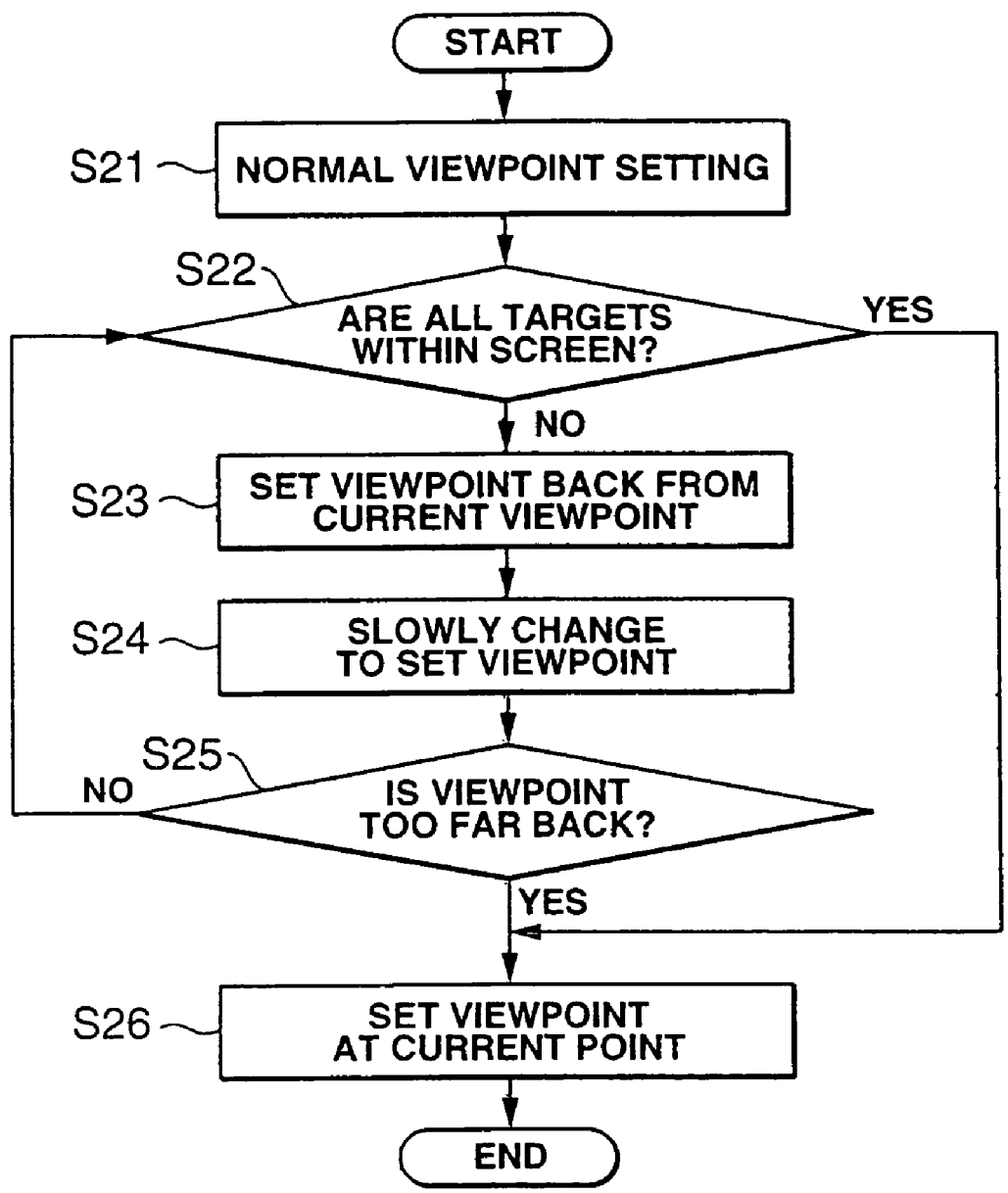
FIG. 6 is a flowchart showing an outline of automatic viewpoint setting.

FIG. 6 shows a flowchart of the specific procedures involved in automatic viewpoint setting.

First, an initial state is set in which the viewpoint is in a predetermined position above and behind the head of the home character, this being the normal viewpoint position (step S21). Then, a determination is made as to whether or not all of the display objects (targets) are accommodated in the screen (step S22). If the result of this determination is NO, the viewpoint position is moved rearward and/or upward of the normal position (step S23). If the viewpoint is to be moved by a large distance according to the positional relationship between the home character and the characters to be displayed, and the viewpoint is moved rapidly by this large degree, it becomes difficult for the player to see. To prevent this, the viewpoint movement speed is adjusted so as not to exceed a predetermined speed, whereupon viewpoint movement control is performed to move the viewpoint to the target viewpoint position (S24). At this time, a determination is made as to whether or not the viewpoint has moved too far backward from the position of the home character or enemy characters, or in other words whether the viewpoint has moved within the predetermined distance (step S25). If the viewpoint is too far back (YES), the position thereof is set as the viewpoint position, and if the viewpoint can be moved further backward (NO), the process is repeated from step S22. If the home character can be sufficiently perceived and all of the display objects are accommodated within the screen (step S22, YES), the modified viewpoint is maintained at that point (step S26).

Note that if the positional relationship of the characters changes before the viewpoint arrives at the target when the viewpoint is moved at a predetermined speed, the target viewpoint position may also be changed. In such a case, processing such as constantly moving the viewpoint to the newest target position or considering the difference between the current viewpoint position and the newest target viewpoint position such that the current viewpoint position is given priority when the difference is small may be performed.

In this automatic viewpoint setting, the limit by which the viewpoint is moved rearward and/or upward is a range within which the home character and enemy characters can be distinguished. In the flowchart described above, this limitation is determined according to the distance between the home character and the viewpoint. Alternatively, the processing may be modified such that a limit to the display size of the home character is determined in advance, for example, and when this display size is reached viewpoint movement is prohibited.

Figure 7:
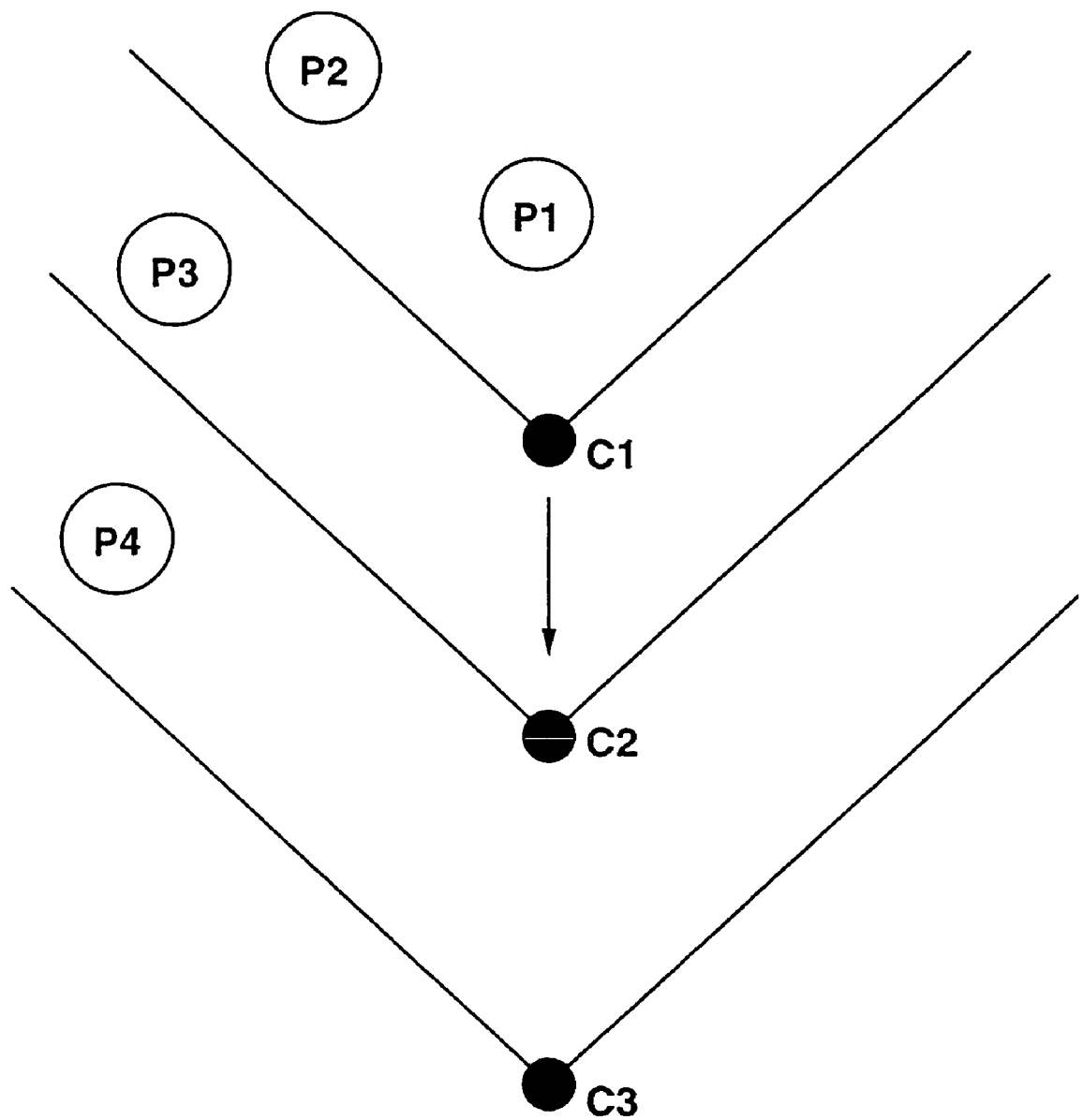
FIG. 7 is a view schematically illustrating automatic viewpoint setting.

FIG. 7 shows the disposal of the characters on a plane (XZ plane) in the virtual space. In this embodiment, the viewpoint position set above and behind the head of the home character is automatically controlled as shown in FIG. 7. Initially, a viewpoint C1 is set with a display object P1 (the home character) as a reference. When P2 is the only other display object, the viewpoint C1 is maintained as is. When two display objects, P2, P3 are present, however, the display object P3 is not accommodated within the field of vision from the position of the viewpoint C1. Hence the game device moves the viewpoint rearward and/or upward at a predetermined speed in accordance with the flowchart in FIG. 6 until the display object P3 is accommodated. When three display objects, P2 to P4, are present, the display object P4 is not accommodated in the field of vision even from the position of the viewpoint C2. At this point, the viewpoint would be moved further rearward in accordance with the processing in steps S22 to S24 of FIG. 6. However, when the viewpoint is moved to the position of the viewpoint C3, the home character becomes difficult to distinguish from the other characters, and an image which is far removed from the image obtained at the initial viewpoint C1 position is provided. Hence the limitation according to step S25 (YES) is imposed, and the viewpoint C2 position is maintained.

When only P2 remains as the other display objects (that is, when the display objects, including the home character, consist of P1 and P2 alone), processing is performed such that the viewpoint is automatically returned to C1 at a slow predetermined speed.

(Fighting Strength Balance Adjustment Processing)

The auxiliary processing (fighting strength balance adjustment processing) executed in step S5B of a competitive game will now be described on the basis of FIGS. 8 through 11.

This processing is performed in a communication game system such as the system of this embodiment, which is constituted to be capable of executing a competitive team game with two players forming one team, to consider predetermined conditions corresponding to the balance of fighting strength between the teams playing the competitive game and to adjust the balance of fighting strength between the teams in accordance with these conditions. For example, when an imbalance arises in the number of characters in the teams participating in the competitive game, the number of characters in each team is equalized, weighting conditions are placed on the team having an advantage of a predetermined standard or higher in accordance with an imbalance arising between the teams during the course of the competitive game, or similar. In other words, if an imbalance in fighting strength arises at the start of or during the game when a multiple player against multiple player competition is performed, weighting conditions are placed on the superior team or help is provided to the inferior team, and thus a balance of fighting strength can be attained. By means of this processing, the amount of time during which the fighting strength of the teams is substantially equal can be extended, and the players can be kept in a state of excitement and tension.

Items that can be considered as team imbalances are the number of characters per team, set character abilities in the game, the winning percentage of the characters, the winning percentage of each team, and so on.

Auxiliary processing will be described specifically below. Any of the first through third auxiliary processings may be executed selectively or in combination.

The first auxiliary processing is executed to correct an imbalance in the number of characters per team. The game device compares the number of characters per team at the start of the game, or in other words the number of participating players, and if there is an imbalance in the numbers, supplements the number of characters in the team that is lacking in characters.

As shown in FIG. 8A, for example, when team B has fewer participating characters than team A, the game device adds a character A1 controlled by the game device itself to team B which is lacking in participating characters. This character A1 is constructed to be capable of competing against team A in conjunction with the character manipulated by a player C.

The auxiliary processing of this embodiment is not limited only to a case in which an imbalance arises in the number of participating players. When the minimum number of participants to implement a team competition is not satisfied, characters may be supplemented to satisfy the minimum number of participants. As shown in FIG. 8B, for example, if the minimum number of participants is set as two per team, but one player joins team A and one player joins team B the game devices belonging to each team add the character A1 (in this case one character) controlled by the game devices until the minimum number of participants is satisfied.

By means of this auxiliary processing, imbalances in the number of characters are eliminated and team fighting strength is equalized. Hence processing is simplified.

The second auxiliary processing is to place weighting conditions on the team having an advantage of a predetermined standard or higher in accordance with an imbalance arising between the teams during the course of the competitive game. For example, if the number of characters belonging to a team falls by a fixed number or more during a competitive game, impediment processing in the form of weighting conditions is performed on the team having the larger number of characters in order to correct the resultant imbalance. In the case of a shooting game, for example, the impediment processing may be that the characters belonging to the superior team are prohibited from facing the direction of the characters belonging to the inferior team, an aim-locking function required when attacking a character may be disabled for a predetermined length of time only for the characters belonging to the superior team, or similar.

Figure 9A:
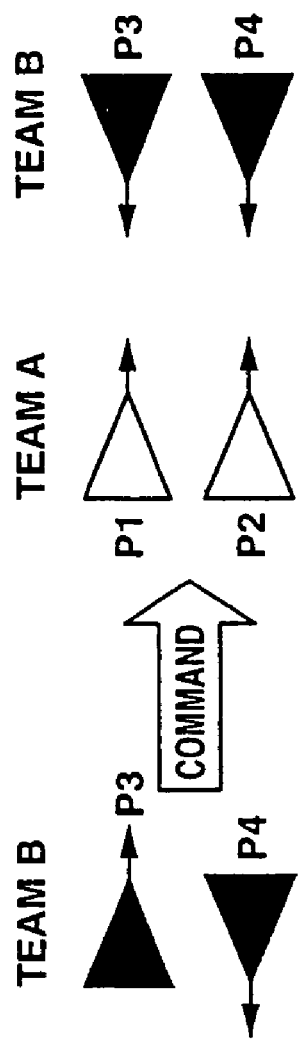
FIG. 9 is a view illustrating another example of auxiliary processing.
Figure 9A:
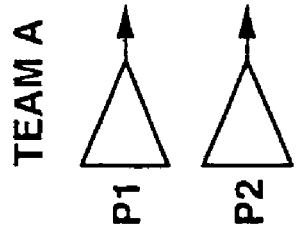
Figure 9B:
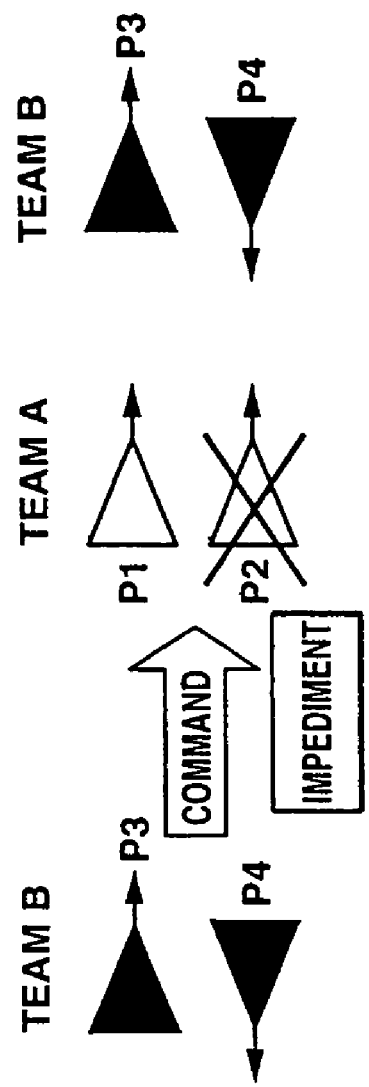
Figure 9B:
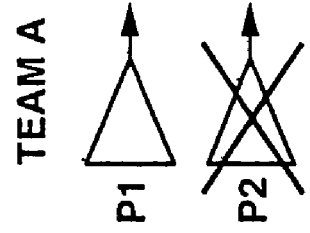

If, for example, no imbalance in the number of characters per team arises, the player manipulating a character P3 on team B is able to cause this character to face the direction of a character on team A, as shown in FIG. 9A. When a character P2 on team A is eliminated such that the number of characters in team A decreases, as shown in FIG. 9B, the game devices to which the characters of team B belong apply weighting conditions to the characters of team B. In order to target a specific character from the plurality of characters on the opponent team, the shooting game of this embodiment is provided with a locking function for specifying a target opponent as a lock subject by means of a player operation, and an automatic tracking function for automatically following the direction of the opponent who is the current lock subject by means of a player operation, for example. If the number of characters on the opponent team decreases throughout the course of the game, impediment processing is performed on the team having the larger number of characters such that the locking function and automatic tracking function are disabled for a predetermined length of time or until the imbalance between the teams has been removed. In other words, when an imbalance arises, the game device prohibits the character P3 of team B, which was not facing the direction of a character on team A, from locking onto a character belonging to team A or turning in the direction thereof. When the imbalance is removed (when one of the characters on team B is eliminated or a character is added to team A, for example) or a predetermined length of time has elapsed, the impediment processing is canceled. By means of this auxiliary processing, the fighting strength of a team which is superior in terms of character number is forcibly reduced temporarily, thereby providing the inferior team with an opportunity to make a comeback and time to consider subsequent strategy.

The third auxiliary processing is performed during a competitive game to allow one character on a team to help another character. A physical strength parameter indicating game strength and endurance is set for each character. In the communication game system of this embodiment, this physical strength parameter may be transceived between game devices and thereby mutually communicated. The physical strength of a character belonging to a game device which receives the physical strength parameter can be raised in accordance with the "physical strength" shown in the received physical strength parameter. By means of such a function, the characters within a team are capable of "helping each other".

Figure 10:
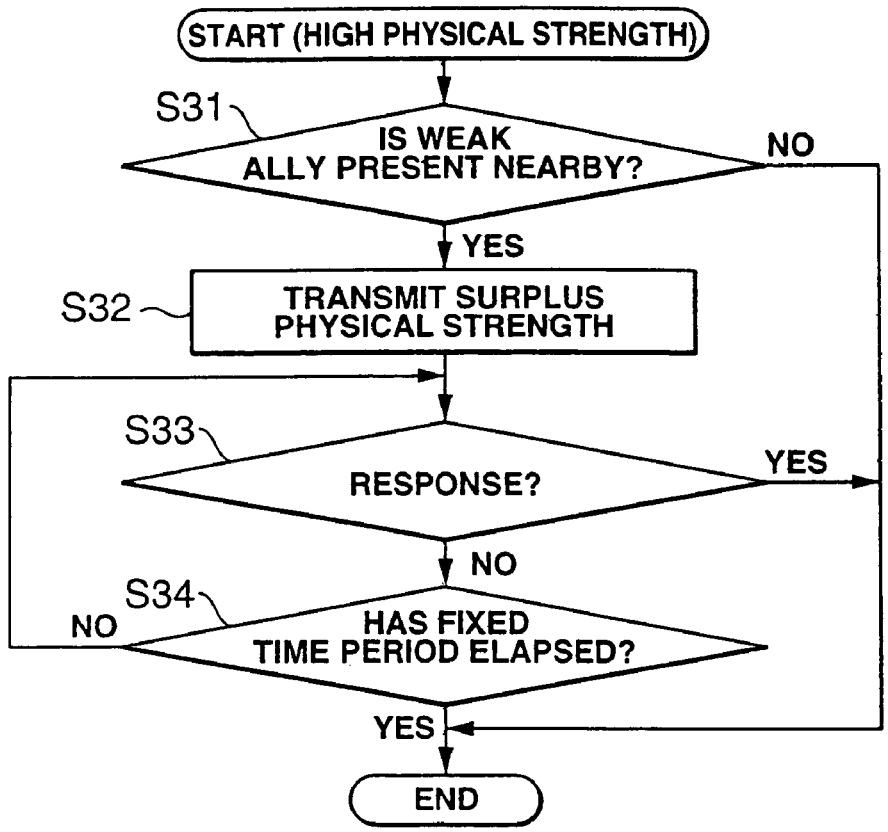
FIG. 10 is a schematic flowchart illustrating another example of auxiliary processing.
Figure 11:
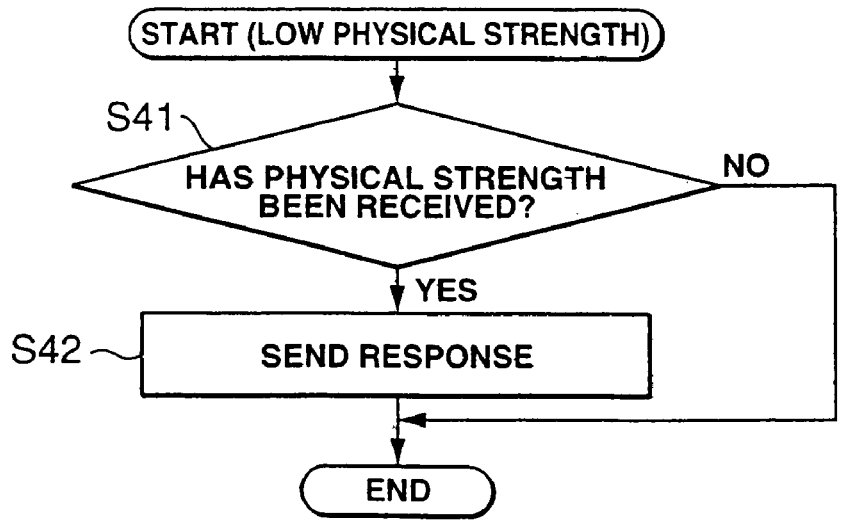
FIG. 11 is a schematic flowchart illustrating an example of auxiliary processing together with FIG. 10.

A specific example of this auxiliary processing will be described on the basis of the flowcharts in FIGS. 10 and 11. FIG. 10 illustrates processing performed when the fighting strength, or in other words the physical strength, of a certain character is sufficient, and FIG. 11 illustrates processing performed when the fighting strength is reduced. Here, it is assumed that the fighting strength of allied characters belonging to the same team is monitored by the game devices of the characters through the transmission and reception of the physical strength parameter of the characters and the like. It is also assumed that upon execution of this auxiliary processing, the processing is performed in consideration of the time delays arising when the game devices transmit and receive data via a network.

When the physical strength of a character is sufficient, first a determination is made as to whether an allied character is present in the vicinity of the character within the virtual space, and whether the physical strength of this character is reduced (step S31). Reduced physical strength indicates that the physical strength parameter of the character has fallen to or below a fixed value, or that the physical strength parameter value is relatively lower than that of the home character, for example. If a character with reduced physical strength is discovered (step S31, YES), the game device transmits the surplus physical strength of the home character to the character with reduced physical strength as a physical strength parameter (step S32). When the game device to which the character with reduced physical strength belongs receives the physical strength parameter (step S41, YES), the physical strength of the home character of this game device is increased in accordance with the physical strength parameter, and a response is transmitted indicating reception of the parameter (step S42). When this response reaches the game device which transmitted the physical strength parameter (step S33, YES), processing ends. If, on the other hand, the response does not arrive (step S33, NO), the processing waits for a fixed time period (step S34, NO to step S33), and when the fixed time period has elapsed (step S34, YES), processing ends. When the response arrives, the game device reduces the fighting strength of its home character by the transmitted physical strength parameter. During a time-out when the response does not arrive, reduction of fighting strength from the home character is prohibited. By means of such processing, physical strength transfer is performed securely.

Note that in the processing described above, a character with sufficient physical strength is able to help a nearby character with reduced physical strength. However, the processing may be set such that a character with reduced physical strength detects nearby allied characters in order to share the physical strength thereof. Here, processing to share physical strength may be processing whereby a character who wishes to receive or share out physical strength approaches an allied character or the like. It should be noted, however, that there are cases in which a player wishes to continue the game without distributing physical strength or the like even when a weak or fallen character is present, and thus setting may be performed such that physical strength distribution is not performed unless the bodies of the characters come into contact with each other.

If there are no characters in the vicinity with reduced physical strength, the game device may expand the range for detecting allied characters by means of a player operation such that when an allied character with reduced fighting strength is discovered, the home character can advance in that direction automatically. According to this processing, the probability of aiding an allied character is increased. This detection processing may also be executed in relation to an allied character whose fighting strength is not reduced. By means of such a constitution, when the fighting strength of the home character decreases, the player can search for an allied character with sufficient fighting strength and receive physical strength from that character. In such cases, the processing for detecting an allied character may be performed automatically on the game device side rather than being dependent on a player operation. At this time, a simple operation indicating the desire of the player to search for an allied character is sufficient.

(Light Beam Bullet Projection Processing)

Next, the light beam bullet projection processing executed in step S5C will be described on the basis of FIGS. 12, 13.

In the projection processing in this embodiment, a projected image object emulating a projected image of a spatial object in relation to the surface of a terrain set within the virtual space is generated, the projected image object is moved in accordance with the movement of the spatial object, and the, magnitude of the displayed projected image object is modified in accordance with the position of the spatial object within the virtual space and the position of a virtual light source set in the virtual space. When the distance of the spatial object from the terrain surface exceeds a reference distance, the magnitude of the projected image object is held at a predetermined magnitude.

Figure 12A:
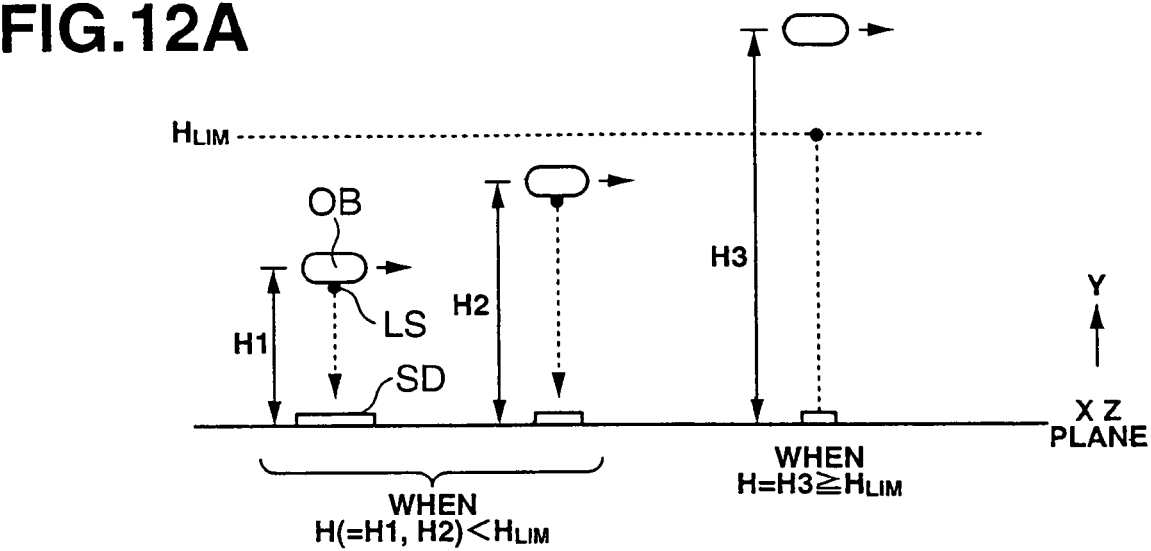
FIG. 12 is a view illustrating threshold processing and the flight of a light beam bullet in projection processing for the light beam bullet.
Figure 12B:
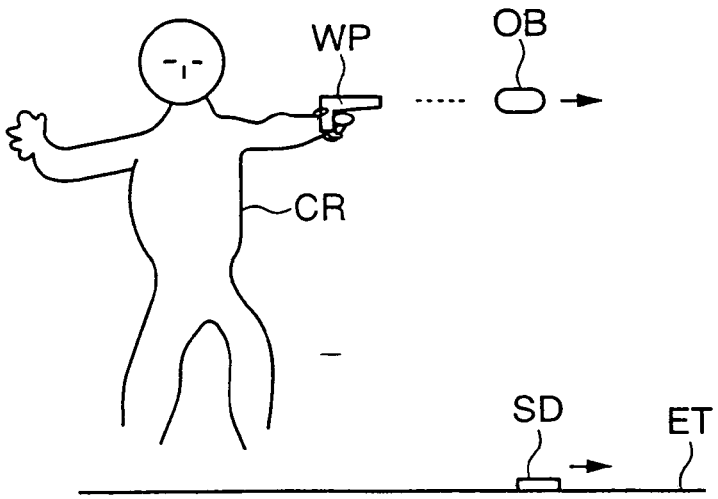
Figure 13:
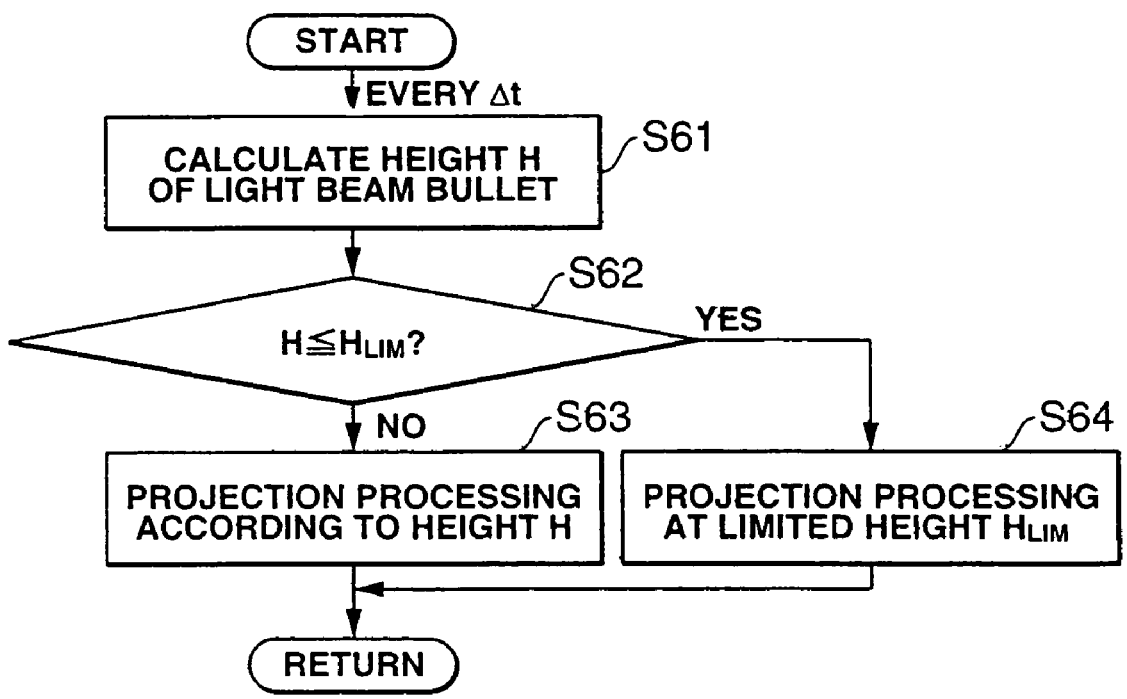
FIG. 13 is a schematic flowchart illustrating threshold processing in the light beam bullet projection processing.

FIGS. 12A and B show an outline of this projection processing in a virtual space. As shown in FIG. 12B, in this competitive game, a player operates the controller to enable a light beam bullet OB serving as a spatial object to be fired from a weapon WP of the home character CR toward an enemy character. The game device generates a shadow SD of the light beam bullet OB to serve as a projected image object in accordance with the distance between the position of the light beam bullet OB and the earth ET, and disposes (projects) the shadow SD on the earth ET. The shadow SD moves in accordance with the movement of the light beam bullet OB. It is envisaged that the light beam bullet OB in this competitive game shines, and hence the shadow SD is an image of light impinging on a surface rather than a dark image. A light source LS (a point light source, for example) is virtually disposed directly below the fired light beam bullet OB, and the light irradiated from the light source in the direction of the earth is used to alter the magnitude of the shadow SD in accordance with the position of the light beam bullet OB. Hence, as shown in FIG. 12A, the surface area of the shadow SD is controlled to become smaller as the height H of the light beam bullet OB from the earth ET increases.

In conventional games, shadow projection processing is performed regardless of the height of the spatial object from the earth. In this embodiment, however, the game device performs processing to prevent the shadow SD from becoming too small by providing the height H of the point light source LS with a limiting value $H_{LIM}$ such that when the height of the light beam bullet OB exceeds the limiting value $H_{LIM}$, the point light source LS is separated from the light beam bullet OB.

This processing will be described on the basis of the flowchart in FIG. 13. First, the game device updates the height H from the earth ET and firing direction of the light beam bullet OB at each processing cycle using operating information, information regarding the position of the character CR, information regarding the orientation of the arm part of the character, and so on (step S61). The height H and height limiting value $H_{LIM}$ are then compared (step S62), and if $H \leq H_{LIM}$ (YES), an image of the shadow SD serving as the projection image object is generated at a magnitude corresponding to the height H of the light beam bullet OB and projected onto the earth ET (step S63). If, on the other hand, $H > H_{LIM}$ in step S62 (NO), the light source LS is held at the height limiting value $H_{LIM}$ and the shadow SD is projected at the magnitude that is projected from the height limiting value $H_{LIM}$ (step S64). According to this processing, when the height H of the light beam bullet OB is within the height limiting value $H_{LIM}$, as is the case when the height H of the light beam bullet OB is at H1 or H2 in FIG. 12A, the shadow SD of the light beam bullet OB is projected gradually smaller as the height of the light beam bullet OB increases. However, when the light beam bullet OB travels in excess of the height limiting value $H_{LIM}$, as is the case when the height H of the light beam bullet OB reaches H3, the shadow SD of the light beam bullet OB is projected at a fixed magnitude with a surface area corresponding to the height limiting value $H_{LIM}$. By means of this processing, the shadow SD of the light beam bullet OB is prevented from becoming indefinitely smaller in accordance with the height of the light beam bullet OB, and thus the players do not become unable to perceive the shadow. Hence, according to this embodiment, the players are able to follow the trajectory of a light beam bullet OB easily by the presence of the shadow SD even when the light beam bullet OB is emitted from a height.

(Automatic Leader Setting)

Figure 14:
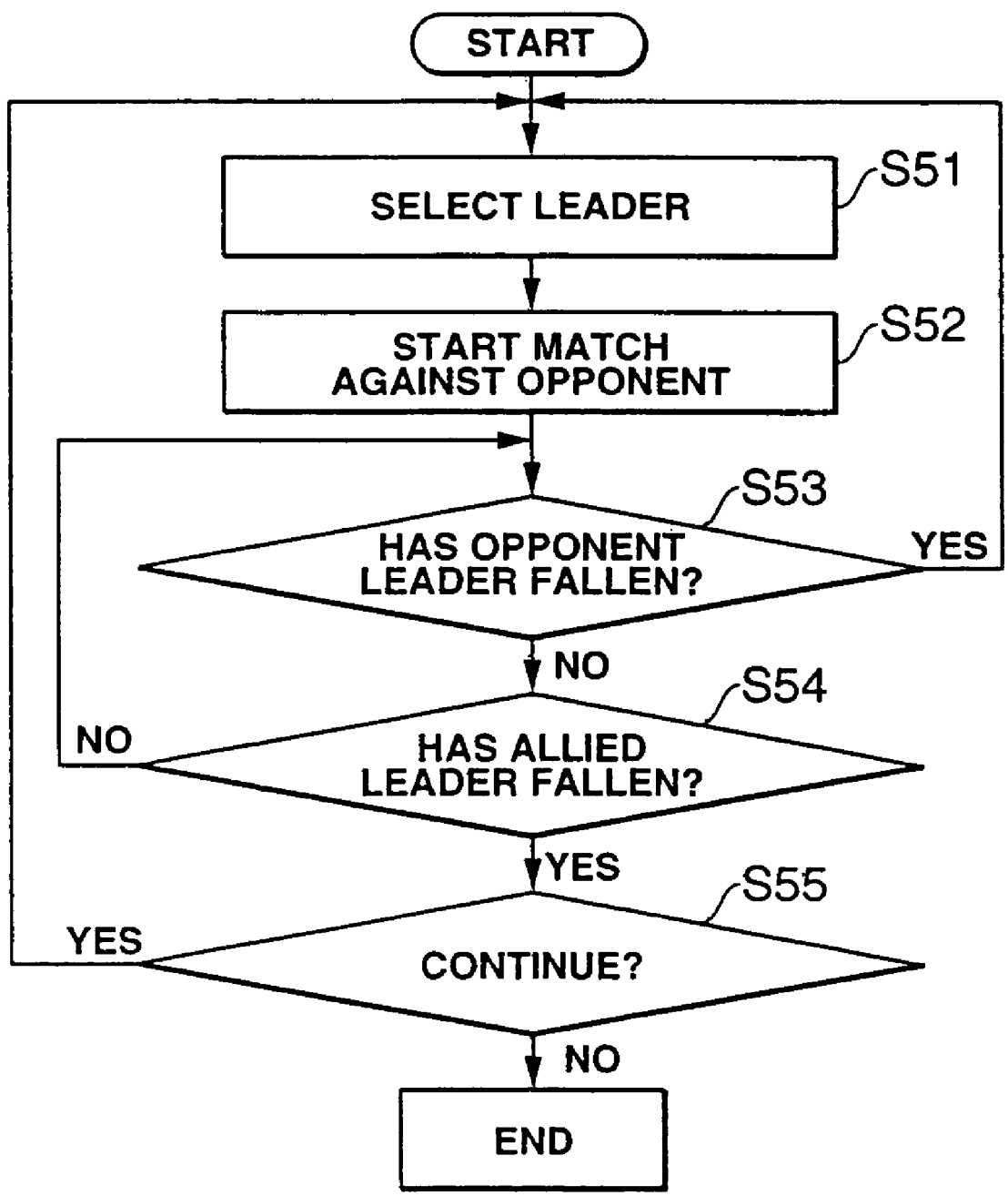
FIG. 14 is a schematic flowchart illustrating automatic leader setting processing.
Figure 15A:
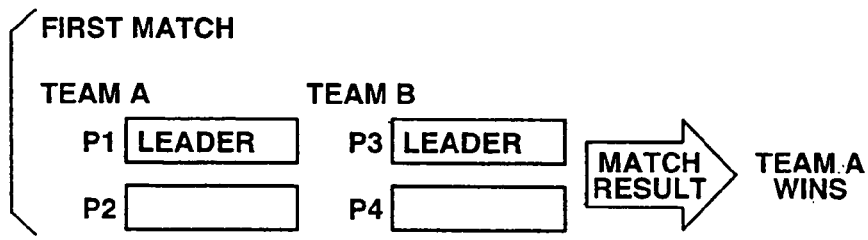
FIG. 15 is a view showing an example of automatic leader setting processing when the outcome of a game is decided after playing a plurality of times.
Figure 15B:
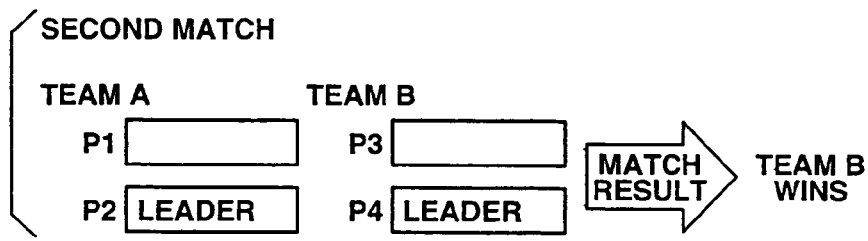
Figure 15C:
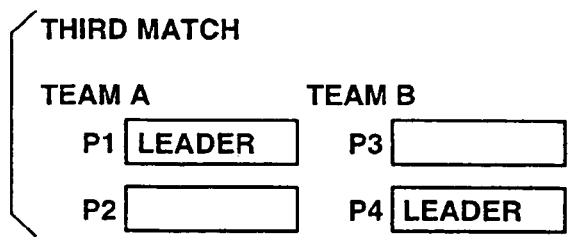

Next, the automatic leader setting processing that is executed in step S5D will be described on the basis of FIGS. 14, 15.

This automatic leader setting processing is performed in a communication game system constituted to be capable of implementing a competitive team game with at least two players forming one team, to determine the relative strength of each team playing the competitive game according to whether or not a leader character specified as a leader by each team is active. If it is determined that the leader character is active, the team to which the leader character belongs is judged the winner.

In a team competition, the outcome of the game is usually determined at the point where all of the characters on one team have been eliminated such that the number of remaining characters reaches zero. By determining the outcome according to these conditions, however, too much time may be required to reach the conclusion of the game. Hence in this embodiment, one leader character (representative) is automatically designated by the game device from among the characters belonging to each team, and the team whose leader character remains alive last is designated as the winning team regardless of whether the characters other than the leader are alive or dead. In so doing, the time required to conclude the game is shortened, and the amount of calculation processing for determining the conclusion can be greatly reduced.

This automatic leader setting processing will be described on the basis of FIG. 14. First, before the game begins, the game device designates one of the characters belonging to each team as a leader (step S51). Information regarding the character designated as leader is shared among the game devices participating in the competitive game through transmission and reception. When the competition begins (step S52), competitive game processing proceeds. When it is judged from the game processing relating to one home character that the leader character of the opposing team has been eliminated (step S53, YES), the game device judges that the team to which its home character belongs has won, and performs the corresponding processing. If it is judged that the leader character of the team to which the home character belongs has been eliminated (step S53, NO; step S54, YES), the game device judges that the team to which its home character belongs has lost, and performs the corresponding processing. This processing continues as long as the game proceeds (step S55, NO). By means of this automatic leader setting processing, judgment of the outcome of the game is limited to the survival of the character designated as leader. Hence calculations to add up the total fighting strength of all of the characters or the remaining number of characters are unnecessary, thus lightening the calculation load. Moreover, the time required to conclude the game can be reduced.

If a constitution is provided whereby a stage at which an outcome is determined can be executed multiple times for each competitive game, the character designated as leader may be switched automatically at each stage. When such a constitution is provided, the game device varies the leader character in the game at each stage. The leader character may also be rotated within a team, or the leader characters for all of the stages may be allocated prior to the beginning of a competitive game. By allocating the leader in advance, processing time for designating a leader character at each stage can be reduced.

When the leader is switched at each stage, the game device may be constituted to automatically re-designate the leader character with the best results through the previous stages in the final stage. In other words, the game device designates the character (player) with the highest winning percentage of the team, according to the scoreline of the current card, as the leader character only in the final stage. Here, recording means for recording the winning percentage of each character or the winning percentage as a team are provided to determine the character or team with the highest winning percentage. Note that the processing for designating the character with the highest winning percentage as leader may also be executed in stages other than the final stage.

A specific example of automatic leader setting processing will be described on the basis of FIG. 15. The outcome of this competitive game is set to be determined over three stages (game, match) such that the first team to win two games is judged the winner. In FIG. 15A, team A, playing with the leader character P1, wins the first match, and team B, playing with the leader character P4, wins the second match. Hence the scoreline at the third match is a 1-1 draw. At the start of the third match, the game device reselects the character who served as leader when the team won as the leader for both team A and team B. In other words, P1 in team A and P4 in team B are set automatically to serve as the respective leader characters. According to this processing, the final competition is played between teams headed by strong leader characters, and thus a sufficient level of game tension and excitement can be provided in the final stage.

Note that this processing is closely related to fighting strength balance adjustment processing. More specifically, when the physical strength of a character in one of the teams other than the leader character is damaged by an enemy character, for example, and thereby decreases, the leader character may distribute his/her own physical strength to the character with reduced physical strength. According to such processing, disadvantages caused by imbalances in the number of characters are eliminated and the player manipulating a fallen character is given an opportunity to return to the game. As a result, even a player whose character is damaged can remain interested in the game.

(Relative Strength Judgment)

Next, processing for judging the relative strength of the teams, which is executed in step S5F, will be described on the basis of FIG. 16.

The relative strength judgment processing of this embodiment is performed in a communication game system constituted to be capable of implementing a competitive team game with at least two players forming one team to determine the relative strength of each team playing the competitive game on the basis of the total fighting ability within the team. More specifically, the proportion of a maximum fighting ability value of the character manipulated by each player in the competitive game that is occupied by a current fighting ability value thereof is calculated, and this proportion is totaled for each team to determine the relative strength of the teams.

This relative strength judgment processing is suitable for a game in team competition mode. In other words, this processing can be used to compare among the competing teams the total game strength of each team, that is the physical strength and power thereof.

Each game device stores a maximum value of a parameter, for example a physical strength parameter, indicating the fighting strength given to each character belonging to each team. Each game device calculates the current physical strength value of each character from operation information, movement distance information, and the state of damage relating thereto. The game device then calculates the proportion of the calculated physical strength value to the maximum physical strength value (100%) stored in advance for each character.

Figure 16:
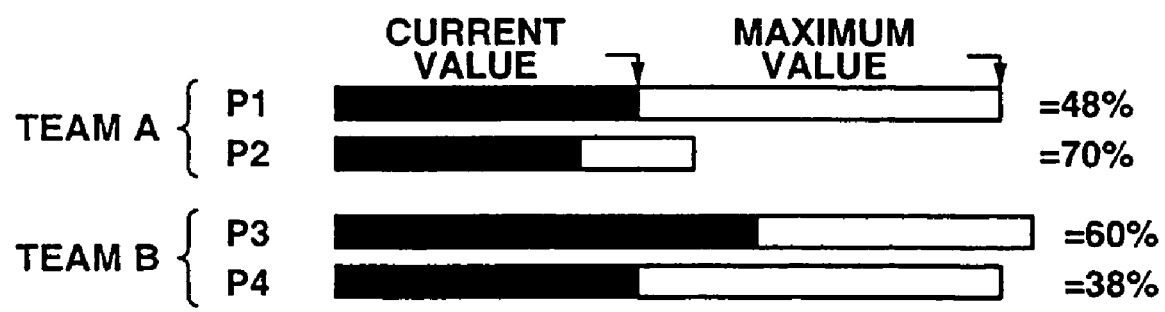
FIG. 16 is a pattern diagram of a life meter for each character in each team, illustrating processing for judging the relative strength of each team.

FIG. 16 shows an example of this calculation. In this example, two characters belong to team A and team B respectively. When the competition ends, first the game device calculates the proportion of the current value of a physical strength evaluation to the maximum value. For example, the current values of a physical strength evaluation of the characters P1 and P2 of team A are 48% and 70% respectively, and the current values of a physical strength evaluation of the characters of team B are 60% and 38% respectively. Next, the game device adds up the total current physical strength values of each team to thereby calculate a total team value. Here, the total team values of team A and team B are 118% and 98% respectively. Finally, the game device compares the total value of each team to judge their relative strength. Here, it is determined that team A, which has a higher total value, is superior.

Note that the total value of each team is displayed on the game screen in real time as a gauge or numerical value. A life meter illustrating the proportion of the current physical strength value of each character may be displayed together with the total value.

(Semi-Transparentizing Processing)

Figure 17:
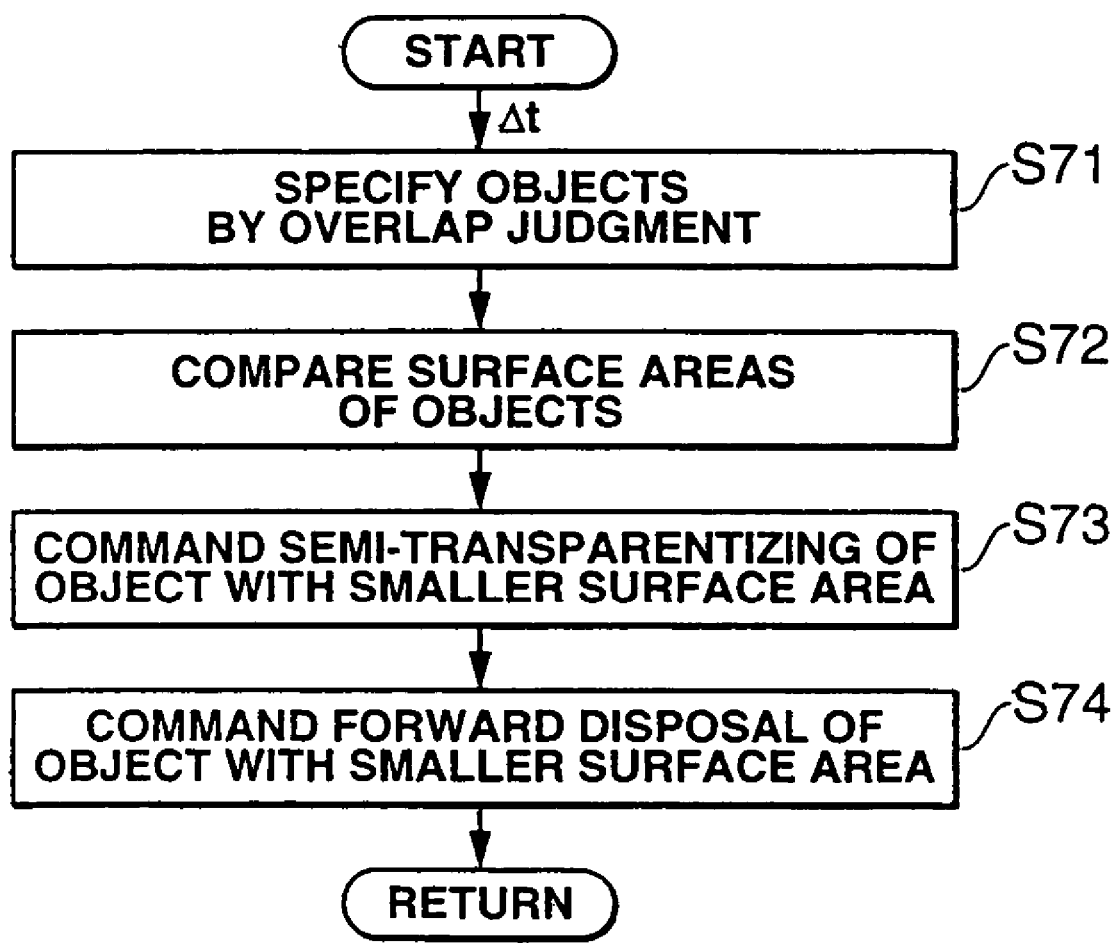
FIG. 17 is a schematic flowchart illustrating semi-transparentizing processing.
Figure 18A:
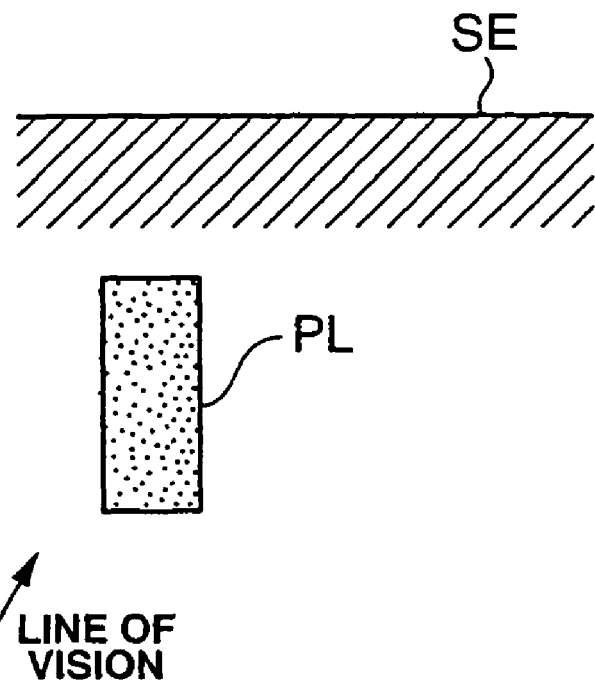
FIG. 18 is a view illustrating an example of semi-transparentizing processing.
Figure 18B:
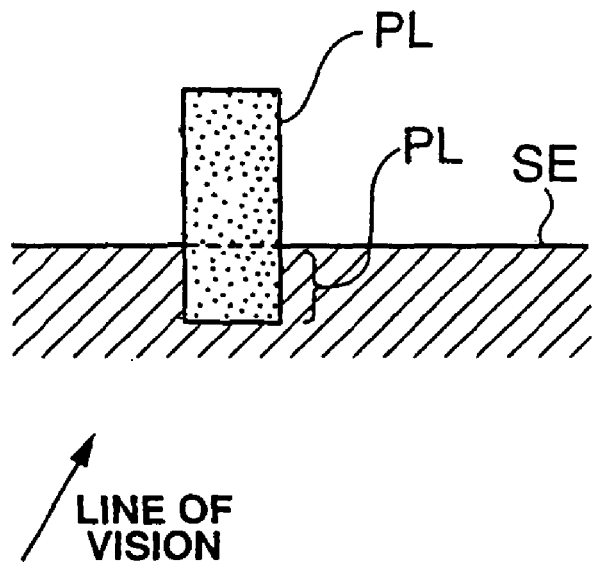

The semi-transparentizing processing executed in step S6 of FIG. 4 will be described on the basis of FIGS. 17, 18.

In the semi-transparentizing processing of this embodiment, a plurality of display objects having at least a partially overlapping relationship within the virtual space are specified, the surface areas of the plurality of display objects when displayed as game images are compared, and he display object with the smaller surface area according to this comparison is made semi-transparent. Further, a game image is generated in which the semi-transparentized display object is disposed in front from the line of vision of the game image.

This semi-transparentizing processing is suitable for displaying a state in which a structure (building posts, the bottom surface of a ship, or similar) serving as an object to be displayed is wholly or partially submerged in water, for example.

This semi-transparentizing processing will be described on the basis of the flowchart in FIG. 17. The CPU 301 performs the processing of FIG. 17 at each update cycle, as shown in FIG. 4. First, the game device determines whether an object such as a structure overlaps another object when seen from the viewpoint using a well-known overlap determination method. As a result, objects overlapping each other and requiring semi-transparentizing processing are specified (step S71). Next, the game device compares the surface areas displayed on the game image of the two specified objects, for example (step S72). As a result of this comparison, the CPU 301 commands the VDP 310 to perform semi-transparentizing processing on the object with the smaller displayed surface area (step S73). In response thereto, the VDP 310 performs semi-transparentizing calculation processing on a part of the texture applied to the specified object by adding and multiplying the color elements of the pixels of this texture and the texture of the object behind the specified object, for example. The CPU 301 also commands the VDP 310 to dispose the semi-transparentized object on the viewpoint side (step S74). As a result of this processing, when a post PL is illustrated partially submerged below the sea SE as shown in FIG. 18A, the displayed surface area of the post PL object is small. Hence the post PL is subjected to semi-transparentizing processing and the texture of the post PL is disposed on the viewpoint side. In other words, the texture of the sea SE is disposed behind the texture of the post PL. When the two objects are displayed overlapping upon display of the game image, the color of the sea SE is made to appear partially transparent through the texture of the post PL at the overlapping part PL' of the two objects, and hence the part PL' of the post PL can be made to appear actually submerged in the sea SE.

In conventional examples, semi-transparentizing processing is sometimes implemented by performing calculations on the entire texture illustrating the sea SE, causing large amounts of calculation. In this embodiment, however, the object with the smaller semi-transparentizing processing load is selected, and thus the amount of calculation for semi-transparentizing processing can be suppressed while maintaining semi-transparence.

(Data Communication With Other Game Devices)

In this embodiment, when a predetermined event occurs, the respective game devices transmit data indicating that this event has occurred to the other game devices implementing the competitive game, and receive data from another of the game devices. Game processing is then executed on the basis of the received data, whereupon data indicating the results of the processing is transmitted to the other game devices. A game image based on the processing results is then generated. More specifically, when an event which is detrimental to the game device on the reception side (for example encountering an attack or the like) occurs, the CPU 301 transmits data indicating that this event has occurred to the reception side game device before implementing processing in the game device.

For example, in the transmission and reception of step S3 in FIG. 4, data indicating that an event has occurred are transmitted from the game device that caused the event to the other game devices (of both the allied team and the opposing team) before processing based on the event is performed in this game device. The other game devices then perform game processing on the basis of the event indicated in the transmitted data and generate a game image based on the processing result which is reflected on the game screen of the game devices (for example displaying an explosion scene).

Also in this embodiment, data indicating the processing result, which are transmitted from the game devices in response to an event occurring in another game device, are received by all of the other game devices implementing the competitive game, whereupon a game image based on the plurality of received processing results is generated. More specifically, the event is acknowledged by the reception side game devices, whereupon the actual game processing (for example explosion processing) is performed, and the processing result is transmitted back to the transmission side game device. In so doing, even when a delay occurs in communication processing and an opponent character manipulated by a reception side game device moves during the delay, processing is performed in the reception side game device such that the character is exploded after the event (explosion or the like) is processed and it is determined that an attack has been encountered. Likewise in the transmission side game device, even if the opponent character moves during the delay, as long as the aim of the attack is accurate, the opponent character can be toppled with certainty. Hence the player operating the transmission side game device can obtain a more favorable result than is recognized from the actual displayed game image, and stress caused by transmission and reception delays does not occur. In the reception side game device, a character is not toppled due to a transmission delay, and hence even when a less favorable result than the situation displayed on-screen is obtained, this result is acceptable.

Here, the data indicating that an event has occurred in the game devices may include at least information specifying the game device which caused the event and information indicating the content of the event.

Further, when data indicating that an event has occurred are received in the game devices, a game image corresponding to the game device which caused the event and the content of the event is generated, and the data indicating the processing results may include at least information specifying the game device which caused the event, the content of the event, and the results of processing in the game device in response to the event.

This delay preventing processing will be described on the basis of FIG. 19. In this example, it is assumed that the game devices 1A to 1D shown in FIG. 1 are conducting a competitive game with each other.

Figure 19A:
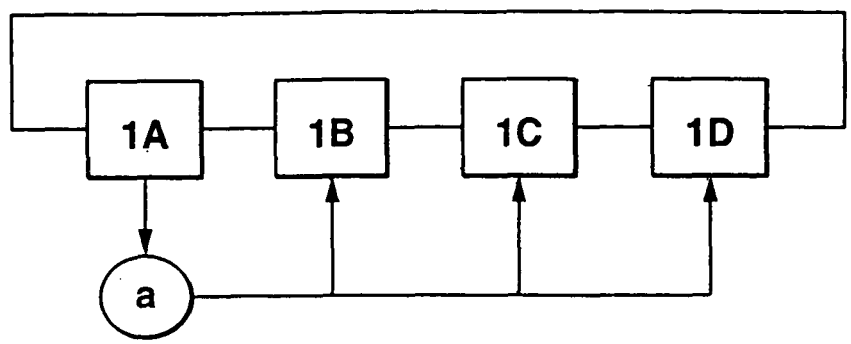
FIG. 19 is a view illustrating data communication in this embodiment.

As shown in FIG. 19A, when the game device 1A enters a situation in which the game must be advanced on the basis of a certain event, event occurrence data a indicating the content of the event are transmitted to each of the other game devices 1B, 1C, 1D.

Figure 19B:
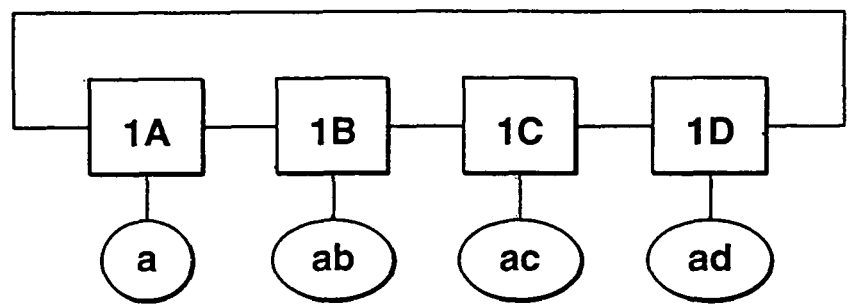

Next, as shown in FIG. 19B, having received the event occurrence data transmitted from the game device 1A, the game devices 1B, 1C, 1D process the received data to obtain processing results ab, ac, ad, whereupon an image based on the results is reflected on the respective game screens.

Figure 19C:
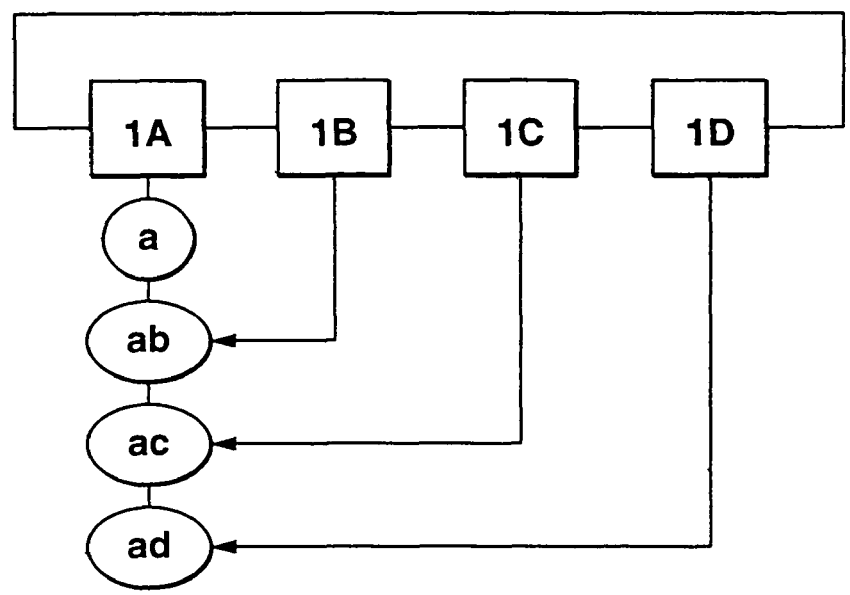

Next, as shown in FIG. 19C, the game device 1A receives the processing result data ab, ac, ad indicating the processing results obtained through processing performed by the other game devices 1B, 1C, 1D.

Figure 19D:
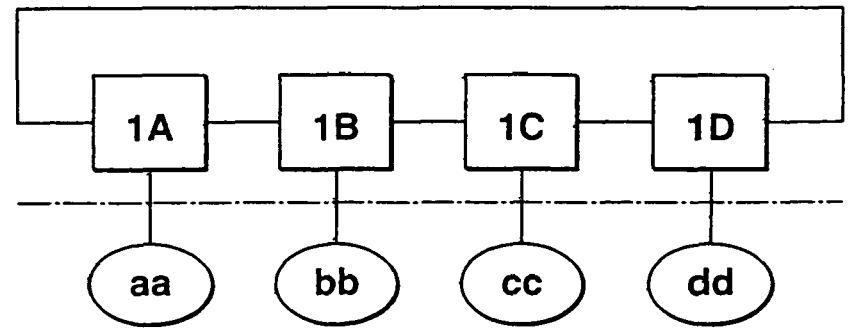

As shown in FIG. 19D, the game device 1A confirms the reception of the processing result data from all of the other participating game devices 1B, 1C, 1D, and then executes processing based on these data and the event occurrence data a. Data delayed by a fixed time period are displayed while data aa indicating the results of this processing are created, and if necessary, the data aa are transmitted to the other game devices.

Similar data transmission and reception, and reflection of the data in the game, are performed in the other game devices 1B, 1C, 1D. More specifically, although not shown in the drawing, the other game devices also transmit their own event occurrence data to the remaining game devices, and the remaining game devices receive these data. Game processing is then executed on the basis of the event occurrence data, whereupon the processing results are transmitted back to the game device which transmitted the event occurrence data. When the game device which transmitted the event occurrence data receives all of the processing result data, game processing is executed and final processing results bb, cc, dd are obtained.

By means of this processing series processing, all of the game devices 1A to 1D are able to display substantially synchronous game screens.

Compared to a conventional method in which an event occurring on a device is processed on that device and then the other devices are informed thereof, in this embodiment delays caused by processing time have no effect on the display on the other devices, and even when a game progresses quickly, operations performed by a player and corresponding changes in an opponent character (an explosion or the like) are not displayed out of position, thereby eliminating any sense of incongruity. In short, a game device which receives data can quickly reflect on-screen results which have an effect on the game screen of that device.

INDUSTRIAL APPLICABILITY

According to the present invention, various advantages can be obtained.

According to the automatic viewpoint setting processing described above, a game device moves the viewpoint position within the space to the rear of the home character in accordance with the position or movement within the virtual space of the characters to be included in the field of vision. Hence the viewpoint position set in accordance with the home character is automatically corrected, and the required characters can be included within the field of vision with certainty.

At this time, the viewpoint is moved within a range in which the distance between the viewpoint and the home character is within a predetermined distance, and thus when a field of vision in which this distance is too long, and which is therefore too wide, is no longer required, the viewpoint position is automatically returned to an appropriate distance. Hence a screen having a sense of tension and excitement can be provided at all times.

Also at this time, the viewpoint is moved at a predetermined speed, thereby preventing rapid screen changes which are difficult to see and cause a sense of unpleasantness. Viewpoint movement is also limited to a range in which the home character can be recognized, and thus a player can concentrate on the game without losing sight of the home character on the screen.

According to the fighting strength balance adjustment (auxiliary) processing of the present invention, the balance of fighting strength between the teams is adjusted in accordance with predetermined conditions relating to the balance of fighting strength between the teams playing the competitive game, and thus whether there is only one player on each team, or whether an imbalance occurs in the number of players on each team, the balance of fighting strength can be adjusted such that a team competition can be played enthusiastically.

When an imbalance occurs in the balance of fighting strength between the teams, the number of characters on each team is made to match, and thus an equal and fair game environment can be provided.

Further, weighting conditions are placed on the team having an advantage of a predetermined standard or higher in accordance with an imbalance arising between the teams during the course of the competitive game, thereby temporarily decreasing the fighting strength of the superior team. Hence the inferior team can be provided with an opportunity to make a comeback, and a sense of tension can be provided to the game.

Further, in the course of a competitive game, one character in a team may help another character, and thus aspects of team play and teamwork, which make real sports interesting, can be provided.

According to the projection processing of the present invention, when the distance of a spatial object from the terrain surface exceeds a reference distance, the magnitude of a projected image object is held to a predetermined magnitude. Hence even when a light ray bullet is fired from a height, a player can easily follow the trajectory thereof using the projected image object.

According to the automatic leader setting processing of the present invention, the relative strength of the teams playing a competitive game is determined according to whether or not a leader character specified as a leader of each team is active in the competitive game. Hence the state of all of the characters need not be checked every time, and only the leader character need be checked, and thus processing for determining the outcome of a game is greatly reduced.

Further, the character designated as leader is switched automatically at each stage, whereby processing for designating a leader many times can be eliminated and the operating load on the player and calculation load on the device can be lightened. Since the outcome of the game is determined according to whether the leader character is active, a game strategy centering on the leader character can be devised, enabling variety in the game content. In the present invention in particular, a leader is set, the toppling of the leader is set as a condition for victory, and when the physical strength of a character in a team other than the leader character decreases, the physical strength of the leader character may be distributed to the character with reduced physical strength. Hence disadvantages caused by an imbalance in the number of characters are eliminated, and the player manipulating a fallen character is provided with an opportunity to return to the game.

According to the relative strength judgment of the present invention, the relative strength of the teams playing the competitive game is determined on the basis of the total fighting ability within the team. Thus a state in which one team is superior can be determined at all times instantly. Conventionally, relative strength is determined by referencing only the power of each character, but by this processing, the relative strength of the teams can be grasped instantly.

Further, the proportion of the current fighting ability value to the maximum fighting ability value in the competitive game is calculated, and this proportion is totaled for each team to determine the relative strength of the teams. Hence processing is simple and the relative strength can be grasped accurately. Moreover, the results of a judgment of the relative strength of the teams may be used easily in other processing such as strength balance adjustment processing and the like.

According to the semi-transparentizing processing of the present invention, the surface area of each of a plurality of display objects is compared when the display objects are displayed as a game image, and the display object with the smaller surface area according to this comparison is made semi-transparent. Thus the calculation load can be greatly reduced while ensuring semi-transparence.

According to the communication delay prevention processing of the present invention, when a predetermined event occurs, data indicating that the event has occurred are transmitted to the other game devices, processing results are transmitted in response from the other game devices, and then a game image is generated. Hence the display of unnatural images based on processing delays that have been noted in communication game systems can be prevented.

According to the present invention as described above, problems relating to game screen display and judgments of the relative strength of teams, and problems caused by game data communication delays, which have been noted in conventional communication game systems, can be amended, thereby reducing calculation processing, increasing speed, and improving the quality of a competitive team game.

Note that the present invention is not limited to the embodiment described above, and may be modified in various ways within the scope of the patent claims.

The invention claimed is:

1. A communication game system in which a plurality of game devices are connected to each other to enable a competitive game to be played between teams in which at least two players each operating one of said plurality of game devices form one team, each game device comprising:
   at least one processor; and
   a memory,
   wherein the at least one processor is configured to:
      determine a relative strength of the teams playing said competitive game according to whether or not a leader character designated as a leader of each team is active in said competitive game, and
      distribute, when a physical strength of a character other than said leader character within a team decreases, a physical strength of said leader character to said character with decreased physical strength.

2. A communication game system in which a plurality of game devices are connected to each other to enable a competitive game to be played between teams in which at least two players each operating one of said plurality of game devices form one team, each of said plurality of game devices comprising:

at least one processor; and a memory, wherein the at least one processor is configured to:

consider, during the competitive game, predetermined conditions corresponding to a balance of fighting strength between the teams playing said competitive game, adjust the balance of fighting strength between said teams in accordance with said predetermined conditions, and cause one character to help another character within a team during said competitive game.

3. A communication game system in which a plurality of game devices are connected to each other to enable a competitive game to be played between teams in which at least two players each operating one of said plurality of game devices form one team, each of said plurality of game devices comprising:

at least one processor; and a memory, wherein the at least one processor is configured to:

consider, during the competitive game, predetermined conditions corresponding to a balance of fighting strength between the teams playing said competitive game, adjust the balance of fighting strength between said teams in accordance with said predetermined conditions, set, as a tracking object, one character from among a plurality of characters comprising an opposing team on the basis of predetermined conditions, and modify the position or orientation of a home character manipulated by a player until said home character enters a range within which the one character set as said tracking object can be attacked.

4. The communication game system according to claim 3, wherein the at least one processor is further configured to:

correct the position or orientation of said home character in accordance with a movement of said one character set as the tracking object such that said home character enters said range within which said one character can be attacked.

5. The communication game system according to claim 3, wherein the at least one processor is further configured to:

use, as the predetermined conditions, one or more conditions selected from a group comprising an absolute physical strength value of an opponent, a relative physical strength value of the opponent to the home character, attacking strength, defense strength, presence of a set leader, and a winning percentage of the player manipulating the home character.

6. A recording medium recorded with a program for causing a computer to execute a game method in which a plurality of game devices are connected to each other to enable a competitive game to be played between teams in which at least two players each operating one of said plurality of game devices form one team, the game method comprising:

determining a relative strength of the teams playing said competitive game according to whether or not a leader character designated as a leader of each team is active in said competitive game; and distributing, when a physical strength of a character within a team other than said leader character decreases, a physical strength of said leader character to said character with decreased physical strength.

7. A recording medium recorded with a program for causing a computer to execute a game method in which a plurality of game devices are connected to each other to enable a competitive game to be played between teams in which at least two players each operating one of said plurality of game devices form one team, the game method comprising:

considering, during said competitive game, predetermined conditions corresponding to a balance of fighting strength between the teams playing said competitive game;

adjusting the balance of fighting strength between said teams in accordance with said predetermined conditions; and causing one character to help another character within a team during said competitive game.

8. A recording medium recorded with a program for causing a computer to execute a game method in which a plurality of game devices are connected to each other to enable a competitive game to be played between teams in which at least two players each operating one of said plurality of game devices form one team, the game method comprising:

considering, during said competitive game, predetermined conditions corresponding to a balance of fighting strength between the teams playing said competitive game;

adjusting the balance of fighting strength between said teams in accordance with said predetermined conditions;

setting, as a tracking object, one character from among characters comprising an opposing team based on predetermined conditions; and modifying a position or orientation of a home character manipulated by a player until the home character enters a range within which the one character set as said tracking object can be attacked.

9. The recording medium according to claim 8, said game method further comprising:

correcting the position or orientation of the home character in accordance with a movement of said one character set as the tracking object such that the home character enters said range within which said one character can be attacked.

10. The recording medium according to claim 8, wherein the game method further includes:

using, as the predetermined condition, one or more conditions selected from a group comprising an absolute physical strength value of an opponent, a relative physical strength value of the opponent to the home character, attacking strength, defense strength, presence of a set leader, and a winning percentage of the player manipulating the home character.

11. A communication game system, in which a plurality of game devices are connected to each other to enable a competitive game to be played between teams in which at least two players each operating one of the plurality of game devices form one team, each of the plurality of game devices comprising:

at least one processor; and a memory, wherein the at least one processor is configured to:

cause relative strength information on the teams playing the competitive game to be shared by communication, adjust a fighting ability balance between the teams based on a physical strength value set for each of a plurality of characters, judge whether or not the physical strength value of any one of the characters is at or below a fixed value, judge, if the physical strength value is at or below the fixed value, whether or not a character with the physical strength value at or below the fixed value and another character in a same team are positioned within a predetermined detection range, and distribute, if the character with the physical strength value at or below the fixed value and the another character in the same team are positioned within the predetermined detection range, a physical strength value of the another character to the character with the physical strength value at or below the fixed value.

12. The communication game system according to claim 11, wherein the at least one processor is further configured to:

distribute, when the character with the physical strength value at or below the fixed value and the another character in the same team are in contact with each other, the physical strength value.

13. The communication game system according to one of claim 11 or 12, wherein the at least one processor is further configured to:

move, if the another character in the same team is positioned within the predetermined detection range, the character with the physical strength value at or below the fixed value to a position of the another character in the same team.

14. The communication game system according to claim 13, wherein the at least one processor is further configured to:

expand, if the another character in the same team is not positioned within the predetermined detection range, the predetermined detection range.

15. The communication game system according to one of claim 11 or 12, wherein the at least one processor is further configured to:

move, if the character with the physical strength value at or below the fixed value is positioned within the predetermined detection range, the another character in the same team to a position of the character with the physical strength value at or below the fixed value.

16. The communication game system according to claim 15, wherein the at least one processor is further configured to:

expand, when the character with the physical strength value at or below the fixed value is not positioned within the predetermined detection range, the predetermined detection range.

* * * * *